United States Patent
Sung et al.

(10) Patent No.: US 11,849,493 B2
(45) Date of Patent: Dec. 19, 2023

(54) MODIFIED METHODS AND SYSTEM OF TRANSMITTING AND RECEIVING TRANSMISSION CONTROL PROTOCOL SEGMENTS OVER INTERNET PROTOCOL PACKETS

(71) Applicant: Pismo Labs Technology Limited, Kowloon (HK)

(72) Inventors: Patrick Ho Wai Sung, Kowloon (HK); Kam Chiu Ng, New Territories (HK); Wan Chun Leung, New Territories (HK)

(73) Assignee: Pismo Labs Technology Limited, Kowloon (HK)

(*) Notice: Subject to any disclaimer, the term of this patent is extended or adjusted under 35 U.S.C. 154(b) by 0 days.

(21) Appl. No.: 17/212,941

(22) Filed: Mar. 25, 2021

(65) Prior Publication Data

US 2021/0235521 A1  Jul. 29, 2021

Related U.S. Application Data

(63) Continuation-in-part of application No. 17/280,072, filed as application No. PCT/IB2019/058338 on Oct. 1, 2019.

(51) Int. Cl.
*H04W 76/12* (2018.01)
*H04L 12/46* (2006.01)
(Continued)

(52) U.S. Cl.
CPC ........ *H04W 76/12* (2018.02); *H04L 12/4633* (2013.01); *H04L 45/74* (2013.01);
(Continued)

(58) Field of Classification Search
CPC .... H04W 76/12; H04L 12/4633; H04L 45/74; H04L 69/16
See application file for complete search history.

(56) References Cited

U.S. PATENT DOCUMENTS

| 8,082,357 B2 * | 12/2011 | Rock ............. H04L 9/40 709/217 |
| 2002/0146016 A1 * | 10/2002 | Liu ............. H04L 69/165 370/401 |

(Continued)

FOREIGN PATENT DOCUMENTS

| FR | 2926939 A1 * | 7/2009 | ............. H04L 47/10 |
| JP | 4503186 B2 * | 7/2010 | ............. H04L 1/1628 |
| JP | 2018074261 A * | 5/2018 | ......... H04L 47/2441 |

OTHER PUBLICATIONS

English Language Abstract of CN108881008A.
(Continued)

*Primary Examiner* — Saad A. Waqas
(74) *Attorney, Agent, or Firm* — FisherBroyles, LLP

(57) ABSTRACT

The present disclosure provides systems and methods which increase the throughput of a TCP-based communication between a first network node and a second network node. First, the first network node sent a first plurality of TCP segments to the second network node. Second, when the second network node receives a second plurality of TCP segments, which is all or part of the first plurality of the TCP segments, the second network node responds by sending one or more TCP acknowledgements to the first network node with the last sequence number of a last segment among all TCP segment within the second plurality of TCP segments. The present disclosure are able to increase the throughput of a TCP connection while decreasing its reliability.

20 Claims, 12 Drawing Sheets

(51) Int. Cl.
*H04L 45/74* (2022.01)
*H04L 69/16* (2022.01)
*H04L 67/146* (2022.01)
*H04L 69/163* (2022.01)
*H04L 69/166* (2022.01)

(52) U.S. Cl.
CPC ............ *H04L 67/146* (2013.01); *H04L 69/16* (2013.01); *H04L 69/161* (2013.01); *H04L 69/163* (2013.01); *H04L 69/166* (2013.01)

(56) References Cited

U.S. PATENT DOCUMENTS

| | | |
|---|---|---|
| 2006/0002301 A1 | 1/2006 | Liu |
| 2006/0182025 A1 | 8/2006 | Kim |
| 2014/0071971 A1* | 3/2014 | Kojima ................... H04L 47/36 370/328 |
| 2014/0313996 A1* | 10/2014 | Suga ................. H04W 56/0045 370/329 |
| 2015/0189008 A1* | 7/2015 | Karkkainen ............. H04N 7/15 709/204 |
| 2019/0312815 A1* | 10/2019 | Altman ............. H04W 28/0231 |
| 2020/0266955 A1* | 8/2020 | Agrawal ............. H04W 72/085 |

OTHER PUBLICATIONS

English Language Abstract of EP1691526A1.
International Search Report in International Application No. PCT/IB2019/058338, dated Jun. 30, 2020.
Written Opinion of the International Searching Authority in International Application No. PCT/IB2019/058338, dated Jun. 30, 2020.
Xie, Xiren, "Computer Network (7th edition)" Publishing House of Electronic Industry, Jan. 31, 2017.

* cited by examiner

MODIFIED METHODS AND SYSTEM OF TRANSMITTING AND RECEIVING TRANSMISSION CONTROL PROTOCOL SEGMENTS OVER INTERNET PROTOCOL PACKETS

RELATED APPLICATION

This patent application is a continuation in-part patent application which claims the benefits of U.S. patent application Ser. No. 17/280,072 filed on Mar. 25, 2021, which is a National Stage entry of Patent Cooperation Treaty Application No. PCT/IB2019/058338, filed on Oct. 1, 2019, each of which are incorporated herein by reference in their entireties.

TECHNICAL FIELD

The present invention is related to data communication and more particularly to a modification of the TCP/IP based data communication by modifying the acknowledgement mechanism in TCP.

BACKGROUND ART

Transmission Control Protocol (TCP) over Internet Protocol (IP), which is more commonly known as TCP/IP, is the primary network model used in the current Internet architecture. IP is an unreliable protocol. Which means that there is no mechanism in IP for the sending node to know whether a particular IP packet has been delivered to the receiving node. Therefore, to make data transmission reliable, IP is used with another reliable protocol such as TCP. TCP is a reliable upper layer protocol of IP. TCP has mechanisms to retransmit undelivered data or data corrupted during transmission to the receiving node. One of the techniques used by TCP to perform retransmission of undelivered or corrupted data bytes is by receiving acknowledgements (or ACK) for the received data bytes from the receiving node. The sending node expects to receive ACK within a predetermined time period, called retransmission time-out (RTO), for each segment or a group of segments sent to the receiving node. When ACK is not received within that time period, the corresponding segments are presumed to be undelivered and are then retransmitted.

Retransmission of undelivered segments ensures reliability of TCP. A significant amount of delay in the TCP transmission may be introduced when waiting for acknowledgments. TCP implementations commonly use either Cumulative Acknowledgements or Selective Acknowledgments, known as SACK. When Cumulative Acknowledgements is used for reliable transmission of bytes, the receiver advertises the next byte expected to receive, ignoring all bytes received and stored out of order. This phenomenon is sometimes referred to as positive cumulative acknowledgment. The 32-bit ACK field in the TCP header is used for acknowledgments, and its value is used only when the ACK flag bit is set.

When SACK is used for reliable transmission of bytes, the receiver reports one or more bytes that is received out of order, and also one or more received bytes that may be duplicated, i.e., received more than once. However, since there is no provision in the TCP header for implementing SACK, SACK is implemented using the options field in TCP segments.

User Datagram Protocol (UDP) is another transport layer protocol which is commonly used to transmit more latency-sensitive data like voice/video. Unlike TCP, UDP is an unreliable upper layer protocol of IP. Some networking devices or applications may drop or give lower priority to IP packets containing UDP segments compared to IP packets containing TCP segments. As a result, a sending application layer process that uses UDP to transmit data may face difficulty delivering the data to a receiving application layer process when the IP packets carrying the UDP segments pass through such devices. In the TCP/IP protocol suite, an application layer process is an upper layer process of a transport layer process. An application layer processes is referred to as ULP and a transport layer processes is referred to as TLP hereinafter.

FIG. 1A and FIG. 1B combinedly illustrate a prior art TCP connection that uses Cumulative Acknowledgement. In contrast to FIG. 1A and FIG. 1B, FIGS. 2A-2B illustrate TCP connections that use Cumulative Acknowledgement according to the present invention. Only the steps corresponding to the data transfer phase of a TCP connection is shown herein because the modified acknowledgement methods disclosed in the present invention are only applicable to the data transfer phase of a TCP connection. One with ordinary skills in the art would readily recognize that the connection-establishment and the connection-termination phases may be implemented using a prior art methods or any future developed method without departing from the scope of the embodiments.

Details corresponding to the segments, such as one or more header fields and their values, are not shown in FIG. 1A and FIG. 1B, but they are included herein. When client ULP (CULP) 103 of client node 101 needs to send data to server ULP (SULP) 106 of server node 102 using TCP, client TLP (CTLP) 104 establishes a TCP connection with server TLP (STLP) 105 in the connection establishment phase 107 of FIG. 1A.

Steps 108 to 119 show the data transfer phase. In connection termination phase 120A the TCP connection between client node 101 and server node 102 is terminated. To simplify the description of the embodiments, the receive-window size (rwnd) of both the CTLP 104 and the STLP 105 for this connection is assumed to be 10000 bytes. The rwnd is also assumed to be unchanged throughout the whole TCP session. But there is no limitation on the rwnd to have only the size of 10000 bytes as it can also be above or below this size. Furthermore, the value of rwnd can be adjusted adaptively by a receiving transport layer process while the TCP session is active.

Each particular port number used by a TLP correspond to a particular ULP. For a TCP connection according to the "client-server architecture", CTLP 104 of client node 101 may connect to STLP 105 of the server node 102 using any port number including the well-known port numbers. According to this architecture, only the client is able to initiate the connection establishment with the server. It is also possible that instead of client-server architecture, a peer-to-peer architecture is used; in such case, any node may initiate a TCP connection with the other node. The methods of the present invention as disclosed herein are applicable to any TCP connection regardless of the network architecture.

At step 108, CULP 103 sends data transmission request to CTLP 104. CTLP 104 then uses Initial Sequence Number (ISN), for illustration purpose, value of 4001 as determined in connection establishment phase 107 to send the first 1000 bytes of data with segment 121. The ISN value of 4001 is used only as an example. CTLP 104 may determine the ISN to have any other value. Segment 121 holds data bytes starting from sequence number 4001 to sequence number 5000, and an acknowledgement with acknowledgement number 16001. Furthermore, the ACK flag of segment 121 is set to indicate that segment 121 contains ACK information.

The transport layer does not comprise any mechanism to number the segments, rather the transport layer numbers the data bytes which are transmitted as the payload of each segment. A sending TLP, such as CTLP 104, uses sequence numbers (or Seq) to keep track of the data bytes being sent. Labels of segment in the figures are shown herein only for illustration purpose and for ease of description. CTLP 104 may retransmit one or more data bytes if the corresponding ACK is not received within RTO. This mechanism of retransmission ensures reliable delivery of data.

CTLP 104 uses a value of 16001 for the ACK field in segment 121 to acknowledge the last byte received from server node 102 in the connection establishment phase 107. The last byte received in the connection establishment phase 107 is numbered 16000. The ACK flag is set in segment 121 to inform the receiving STLP 105 that segment 121 contains an ACK. In segment 121 the CTLP 104 sends 1000 bytes of data which is less than the rwnd of STLP 105. STLP 105 receives segment 121 and delivers it to SULP 106.

CTLP 104 is still allowed to send more data to STLP 105 because total amount of data sent up to this point without receiving the corresponding ACK is 1000 bytes, which is less than the rwnd size of 10000 bytes. At step 109, CULP 103 sends data transmission request to CTLP 104. CTLP 104 creates segment 122 with sequence number 5001. Sequence number 5001 is the number of the next byte of the last byte, which was byte number 5000, sent in the previous segment 121.

Another 1000 bytes of data are sent with segment 122, the number range of which is 5001 to 6000. The ACK number in segment 122 is still 16001 as was in the previous segment because no new data has been received from the server node 102 that needs to be acknowledged. The ACK flag is also set in segment 122 to inform the receiving TLP, which is the STLP 105, that this segment contains an ACK. For illustration purpose, segment 122 was lost during transmission and server node 102 is unable to receive it.

It is known to those who are skilled in that art that there is no requirement that a sending TLP must receive a data transmission request from a corresponding sending ULP before the sending TLP may send a segment to the receiving TLP. A sending TLP uses incoming buffers to temporarily store incoming data bytes from the sending ULP, and outgoing buffers to temporarily store outgoing data bytes for the receiving TLP. The receiving TLP informs the sending TLP about the amount of data bytes that the sending TLP may send before receiving an ACK for the corresponding data bytes. This receiving capacity of a receiving TLP is the rwnd.

It is known to those who are skilled in the art that there is no requirement that a receiving TLP must provide data bytes received from a segment to the corresponding receiving ULP instantly after receiving that particular segment. A receiving TLP may spend some time to process the received bytes before providing them to the ULP. A receiving TLP uses incoming buffers to temporarily store the received bytes and outgoing buffers to temporarily store bytes to be provided to the receiving ULP.

The sending TLP may send data bytes from the buffer as long as the total number of bytes transmitted before receiving an ACK is less than the rwnd size. Furthermore, based on the rwnd size, the sending TLP may not be able to send all data bytes to the receiving TLP, corresponding to a particular data transmission request from the sending ULP. Therefore, a sending TLP may send more than one segments to a receiving TLP, corresponding to the same data transmission request of a sending TLP.

At step 110, CULP 104 sends data transmission request to CTLP 104. CTLP 104 creates segment 123 with sequence number 6001. Sequence number 6001 is the number of the next byte of the last byte, which was byte number 6000, sent in the previous segment 122. CTLP 104 is still allowed to send more data to STLP 105 because total amount of data sent up to this point without receiving the corresponding ACK is 2000 bytes, which is less than the rwnd size of 10000 bytes.

Another 1000 bytes of data, numbered 6001 to 7000, are sent with segment 123. Similar to segment 122, the ACK number in segment 123 is still 16001 because no new data has been received from the server node 102 that needs to be acknowledged. The ACK flag is also set in segment 123 to inform the receiving STLP 105 that segment 123 contains an ACK. Server node 102 is unable to receive segment 123 as segment 123 was lost during transmission.

At step 111, SULP 106 sends data transmission request to STLP 105. STLP 105 creates segment 124 with sequence number 16001. Sequence number 16001 is the number of the next byte of the last byte (which was byte number 16000) sent by server node 102 in the connection establishment phase 107. 1000 bytes of data are sent with segment 124, the number range of segment 124 is 16001 to 17000. The ACK flag is set and the ACK number in segment 124 is 5001 to confirm the receipt of data bytes upto 5000 from the client node 101. CTLP 104 receives this segment and delivers the data bytes to CULP 103.

CTLP 104 is still allowed to send more data to STLP 105 because total amount of data sent up to this point without receiving the corresponding ACK is 3000 bytes, which is less than the rwnd size of 10000 bytes. At step 112, CTLP 104 receives data bytes from CULP 103. Unaware of the situation that segments 122 and 123 were undelivered, CTLP 104 sends segment 125 to STLP 105. Segment 125 has sequence number 7001 and contains subsequent 300 bytes ranging from data bytes numbered 7001 to 7300. Segment 125 also has the ACK flag set. The ACK number in segment 125 is 17001 because CTLP 104 has received upto sequence number 17000 in segment 124. STLP 105 receives segment 125 but does not deliver the corresponding data bytes to SULP 106 because the previous data bytes (5001 to 7000) have not been received yet.

At step 113, SULP 106 sends data transmission request to STLP 105. STLP 105 creates segment 126 with sequence number 17001 as STLP 105 has received an ACK number 17001 in the previous segment 125. Segment 126 contains data bytes ranging from 17001 to 18000. The ACK flag is set and the ACK number in segment 126 is still 5001 because server node 102 has not received the next data bytes corresponding to the last received data byte which was 5000. CTLP 104 receives segment 126 and delivers the 1000 data bytes carried by segment 126 to CULP 103.

At step 114, SULP 106 sends data transmission request to STLP 105. STLP 105 creates segment 127 with sequence number 18001. Segment 127 contains data bytes numbered from 18001 to 19000. The ACK flag is set and the ACK number in segment 126 is still 5001 because server node 102 has not received the next data bytes corresponding to the last received data byte which was 5000. CTLP 104 receives this segment 127 and delivers the data bytes carried by segment 127 to CULP 103.

At step 115, SULP 106 sends data transmission request to STLP 105. STLP 105 creates segment 128 with sequence number 19001. Segment 128 contains 500 data bytes numbered from 19001 to 19500. The ACK flag is set and the ACK number in segment 126 is still 5001 because server node 102 has not received the next data bytes corresponding to the last received data byte which was 5000. CTLP 104 receives segment 128 and delivers the data bytes carried by segment 128 to CULP 103.

At step 116, CTLP 104 has already received four ACK numbered 5001 (one original ACK and three duplicate ACKs). Therefore, at step 116 CTLP 104 starts to retransmit from byte number 5001. CTLP 104 creates segment 129 which contains data bytes numbered 5001 to 6000. CTLP 104 did not need to receive the data bytes again from the CULP 103. Data bytes 5001 to 6000 were still stored in the outgoing buffer corresponding to the CTLP 104 as ACK was not received for them. The sequence number of segment 129 is 5001 corresponding to the first data byte number in segment 129. The ACK flag is set and the ACK number in segment 129 is 19501 to confirm the receipt of data bytes upto 19500. STLP 105 receives segment 129 and delivers the data bytes carried by segment 129 to SULP 106.

At step 117, CTLP 104 continues to send the data bytes for which ACK had not been received. At this step, CTLP 104 sends segment 130 which contains 1000 data bytes numbered 6001 to 7000 from the outgoing buffer. The sequence number of segment 130 is 6001 corresponding to the number of the first data byte in segment 130. The ACK flag is set and the ACK number in segment 130 is still 19501 to confirm the receipt of data bytes upto 19500 from server node 102. STLP 105 receives segment 130 and delivers the data bytes carried by segment 130 to SULP 106.

At step 118, CTLP 104 continues to send the data bytes for which ACK had not been received. At this step, CTLP 104 sends segment 131. Segment 131 contains 300 data bytes numbered 7001 to 7300 from the outgoing buffer. The sequence number of segment 131 is 7001 corresponding to the first data in this segment. The ACK flag is set and the ACK number in segment 131 is still 19501 to confirm the receipt of data bytes upto 19500. STLP 105 receives segment 131 and delivers the data bytes carried by segment 131 to SULP 106.

At step 119, STLP 105 sends segment 132 which does not contain any data bytes. But segment 132 still has sequence number 19501 (subsequent number of the last byte of the last received segment) because it contains an ACK. The ACK flag is set and the ACK is numbered 7301 to confirm receipt upto data bytes 7300.

CULP 103 does not have any more data to send, therefore no more requests are sent to the CTLP 104 during this data transfer phase. CTLP 104 does not send any more segments to acknowledge segment 132 as segment 132 did not contain any data bytes.

In connection termination phase 120A, the TCP connection between client node 101 and Server node 102 is terminated.

Those who are skilled in the art would appreciate that the steps illustrated in FIG. 1A and FIG. 1B are common techniques used by TCP for acknowledgement. They may also appreciate that such acknowledgement techniques may not be able to use all the bandwidth available. State of art techniques are discussed in details here in order to distinguish the present invention from known techniques.

SUMMARY

According to the present invention, methods and systems of data communication between two network nodes using TCP is disclosed. The objective of the present invention is to speed up data communication using TCP and the objective is achieved by the disclosed TCP acknowledgement technique.

According to one of the embodiments of the present invention, a first plurality of TCP segments are sent from a first network node to a second network node. Each of the TCP segments comprises a particular range of data byte having a specific sequence number. The second network node receives a second plurality of TCP segments. The second plurality of TCP segments comprise all or part of the first plurality of TCP segments. When the second plurality of TCP segments comprise only part of the first plurality of TCP segments, this denotes other part of the first plurality of TCP segments are not received by the second network node.

According to one of the embodiments of the present invention, TCP acknowledgement is sent by the second network node corresponding to the sequence number of the next data byte expected sequential to last sequence number among all the data bytes received in the second plurality of TCP segments, regardless whether all the data bytes or only some of the data bytes are received.

According to one of the embodiments of the present invention, the first plurality of TCP segments encapsulates one or more datagrams. The one or more datagrams are originated from a host connected to a local area network (LAN) of the first network node.

In one variant, the first network node sends a third plurality of TCP segments to the second network node regardless acknowledgements received from the second network node.

In another variant, the third plurality of TCP segments are sent without waiting for any acknowledgement from the second network node.

DETAILED DESCRIPTIONS

A multi Wide Area Network (WAN) site-to-site VPN router is a router that supports aggregating the bandwidth of multiple WAN connections. This type of routers are referred to as "Multiple WAN Bandwidth Aggregation Routers" hereinafter. For readability, the acronym "MWBAR" is used hereinafter to refer to "Multiple WAN Bandwidth Aggregation Router". In an MWBAR, bandwidth of a plurality of WAN connections are combined together to create an aggregated tunnel. MWBARs are commonly able to establish and use more than one aggregated tunnel simultaneously with another remote router that uses the same or compatible aggregated tunneling protocol. In addition to distributing multiple transport layer sessions to multiple WAN connections comprised in these aggregated tunnels, some of these MWBARs may also be able to distribute data of the same transport layer session among multiple WAN connections comprised in an aggregated tunnel. Selection of the WAN links for a particular aggregated tunnel may be determined based on various factors such as, but not limited to, source IP address, destination IP address, source port number, destination port number, content of application data, Quality of Service (QoS) requirement of the applications, time and date, user-ID, bandwidth, latency or hop-count of the connected links etc. individually or in any combination thereof. Commonly these MWBARs have the capability to add or remove WAN connections as needed during data transfer. Determining the WAN connections to be comprised in an aggregated tunnel may be performed by an administrator/user or by the router itself according to real-time requirements.

A sending MWBAR may receive various types datagrams and as known as protocol data units (PDUs) such as, but not limited to IPv4, IPv6, ICMP, IGMP, IPsec etc. at its network interfaces. The sending MWBAR may then encapsulate these PDUs with its own protocol-header creating a new PDU and transmit them over an aggregated tunnel. These newly created PDUs are referred to as encapsulation-packets herein. The process of creating encapsulation-packets is an ULP compared to the TLP within a sending MWBAR. When a receiving MWBAR of an encapsulation-packet decapsulates a received encapsulation-packet to retrieve the original PDU, that decapsulation process is also a ULP within the receiving MWBAR.

FIG. 3 illustrates a typical network topology 3000 where a plurality of network nodes, such as network node 301 and network node 302, are capable of being connected together to implement the methods disclosed in the present invention. The network nodes disclosed herein include, without limitation, any computing system capable of sending and receiving data over TCP, such as a personal computer, a server computer, tablet PC, mobile phones, IoT devices, routers, MWBARs, firewalls etc. There is no limitation on the number of such network nodes that can be connected together to implement the methods disclosed in the present invention. Sites 307 and 311 each comprise at least one such network node 301 and 302 respectively. Network 310 may comprise one or more of metropolitan area network (MAN), wide area network (WAN), wireless network, the public switched telephone network (PSTN), the Internet, an intranet, an extranet, or other similar networks. Desktop computer 303 and laptop computer 305 are connected to network node 301 using LAN connection 304 and LAN connection 306 respectively. File server 315 and database server 309 are connected to network node 302 using LAN connection 308 and LAN connection 313 respectively. There is no limitation that only personal computers or server computers can connect to network nodes 301 and 302. Any electronic device with networking capability may connect to network nodes 301 and 302.

Groups of WAN connections 312 and 314 are used by network node 301 and network node 302 respectively for communicating information with each other over aggregated tunnels through network 310. Group of WAN connection 312 comprises of WAN connections 312(1), 312(2) and 312(3). Group of WAN connections 314 comprises of WAN connection 314(1) and 314(2). These number of WAN connections are shown for illustration purpose only. A person skilled in the art would appreciate that any number and arrangement of WAN connections are possible to be adapted by network nodes 301 and 302. WAN connections 312(1), 312(2), 312(3), 314(1) and 314(2) may have similar or different network characteristics, including packet loss rate and bandwidth capabilities. Further, groups of WAN connections 312 and 314 may comprise different types of network connections, such as a WiFi, fiber optics, cable, DSL, T1, 3G, 4G, 5G, satellite connections, Ethernet, ATM, and the like. It is also noted that site 307 and site 311 may be thought of as both a sender or receiver, and discussions regarding the functionality of either site may be implemented on the other site. Communications between sites 307 and 311 may be implemented as a symmetrical network with bidirectional data transfer capabilities.

When establishing an aggregated connection between network node 301 and 302, such as by implementing an aggregated site-to-site VPN connection, a plurality of tunnels 316 may be created. The plurality of tunnels 316 correspond to permutations of the WAN connections 312(1), 312(2) and 312(3) of site 307 with the WAN connections 314(1) and 314(2) of site 311. One or more of the plurality of tunnels 316 may be established through network devices 341. Network devices 341 comprises of network devices 341(a), 341(b) and 341(c) which may disrupt the transmission of or entirely prevent UDP segments to pass through. Such disruption and prevention are not desirable. Network devices 341(a), 341(b) and 341(c) may be network firewalls, routers, Deep Packet Inspection (DPI) devices, or any kind of electronic or computing device that has the capability to identify transport layer segments and decide to drop, delay, assigning lower priority, or allow them.

There is no limitation that the plurality of tunnels 316 must be established through only three network devices as illustrated in network 316 of FIG. 3. The plurality of tunnels 316 may transfer data through any number of network device 341.

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. It is being understood that various changes may be made in the function and arrangement of elements without departing from the spirit and scope of the invention as set forth in the appended claims. For clarity purpose, details relating to technical material that is known in the technical fields related to the embodiments have not been described herein.

Although embodiments of the present invention and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it should be noted that the embodiments may be described as a process which is depicted as a flowchart, a flow diagram, a data flow diagram, a structure diagram, a block diagram, a sequence diagram, a timing diagram or in any combination of these. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Embodiments, or portions thereof, may be embodied in program instructions operable upon a processing unit for performing functions and operations as described herein. The program instructions making up the various embodiments may be stored in a non-transitory storage medium. Moreover, as disclosed herein, the term "non-transitory storage medium" may represent one or more devices for storing data, including read-only memory (ROM), programmable read-only memory (PROM), erasable programmable read-only memory (EPROM), random access memory (RAM), magnetic RAM, core memory, floppy disk, flexible disk, hard disk, magnetic tape, CD-ROM, flash memory devices, a memory card and/or other machine readable mediums for storing information. The term "machine-readable medium" includes, but is not limited to portable or fixed storage devices, optical storage mediums, magnetic mediums, memory chips or cartridges, wireless channels and various other mediums capable of storing, containing or carrying instruction(s) and/or data. A machine-readable medium can be realized by virtualization, and can be a virtual machine readable medium including a virtual machine readable medium in a cloud-based instance.

The term "non-transitory computer-readable medium", "main memory", or "secondary storage", as used herein refers to any medium that participates in providing instructions to a processing unit for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics. Transmission media can also take the form of acoustic or light waves, such as those generated during radio-wave and infrared data communications.

A volatile storage may be used for storing temporary variables or other intermediate information during execution of instructions by processor/processing unit. A non-volatile storage or static storage may be used for storing static information and instructions for processor, as well as various system configuration parameters.

The storage medium may include a number of software modules that may be implemented as software code to be executed by the processing unit using any suitable computer instruction type. The software code may be stored as a series of instructions or commands, or as a program in the storage medium.

Various forms of computer readable media may be involved in carrying one or more sequences of one or more instructions to the processor for execution. For example, the instructions may initially be carried on a magnetic disk from a remote computer. Alternatively, a remote computer can load the instructions into its dynamic memory and send the instructions to the system that runs the one or more sequences of one or more instructions.

A processing unit may be a microprocessor, a microcontroller, a digital signal processor (DSP), any combination of those devices, or any other circuitry configured to process information.

A processing unit executes program instructions or code segments for implementing embodiments of the present invention. Furthermore, embodiments may be implemented by hardware, software, firmware, middleware, microcode, hardware description languages, or any combination thereof. When implemented in software, firmware, middleware or microcode, the program instructions to perform the necessary tasks may be stored in a computer readable storage medium. A processing unit(s) can be realized by virtualization, and can be a virtual processing unit(s) including a virtual processing unit in a cloud-based instance.

Embodiments of the present invention are related to the use of a computer system for implementing the techniques described herein. In an embodiment, the inventive processing units may reside on a machine such as a computer platform. According to one embodiment of the invention, the techniques described herein are performed by a computer system in response to the processing unit executing one or more sequences of one or more instructions contained in the volatile memory. Such instructions may be read into the volatile memory from another computer-readable medium. Execution of the sequences of instructions contained in the volatile memory causes the processing unit to perform the process steps described herein. In alternative embodiments, hardwired circuitry may be used in place of or in combination with software instructions to implement the invention. Thus, embodiments of the invention are not limited to any specific combination of hardware circuitry and software.

A code segment, such as program instructions, may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Alternatively, hardwired circuitry may be used in place of, or in combination with, software instructions to implement processes consistent with the principles of the invention. Thus, implementations consistent with principles of the invention are not limited to any specific combination of hardware circuitry and software.

A network interface may be implemented by a standalone electronic component or may be integrated with other electronic components. A network interface may have no network connection or at least one network connection depending on the configuration. A network interface may be an Ethernet interface, a wireless communication interface, a frame relay interface, a fibre optic interface, a cable interface, a Digital Subscriber Line (DSL) interface, a token ring interface, a serial bus interface, a universal serial bus (USB) interface, Firewire interface, Peripheral Component Interconnect (PCI) interface, etc.

A network interface may connect to a wired or wireless access network. An access network may carry one or more network protocol data. A wired access network may be implemented using Ethernet, fiber optic, cable, DSL, frame relay, token ring, serial bus, USB, Firewire, PCI, or any material that can pass information. A wireless access network may be implemented using infrared, High-Speed Packet Access (HSPA), HSPA+, Long Term Evolution (LTE), WiMax, GPRS, EDGE, GSM, CDMA, WiFi, CDMA2000, WCDMA, TD-SCDMA, BLUETOOTH, WiBRO, Evolution-Data Optimized (EV-DO); Digital Enhanced Cordless Telecommunications (DECT); Digital AMPS (IS-136/TDMA); Integrated Digital Enhanced (iDEN) or any other wireless technologies. A wide area network (WAN) connection may be established over an access network to connect two networks.

Embodiments, or portions thereof, may be embodied in a computer data signal, which may be in any suitable form for communication over a transmission medium such that it is readable for execution by a functional device (e.g., processing unit) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, LAN, MAN, WAN, the PSTN, a satellite communication system, a cable transmission system, and/or the like.

FIG. 6 is an illustrative block diagram of a network node 6000, which has similar functionalities to network node 301 or network node 302 according to one embodiment of the present invention. Router 6000 comprises processing unit 600, main memory 601, system bus 602, secondary storage 603, and network interfaces 604, 605, 606 and 607. Processing unit 600 and main memory 601 are connected to each other directly. Processing unit 600 is connected to secondary storage 603 and network interfaces 604, 605, 606 and 607 through system bus 602. System bus 602 can be any of several types of bus structures including a memory bus, a peripheral bus, and a local bus using any of a variety of bus architectures. Secondary storage 603 stores program instructions for execution by processing unit 600. The scope of the invention is not restricted to router 6000 having four network interfaces, such that router 6000 is allowed to have network interfaces higher or below this number. Among the network interfaces, at least two of the network interfaces are wide area network interfaces.

It shall be appreciated that the present disclosure is not limited to the architecture of system 6000. For example, any suitable processor-based device may be utilized for implementing the above teachings, including without limitation routers, personal computers, laptop computers, computer workstations, multiprocessor servers, and even mobile telephones. Moreover, certain embodiments may be implemented on application specific integrated circuits (ASICs) or very large scale integrated (VLSI) circuits. In fact, persons of ordinary skill in the art may utilize any number of suitable structures capable of executing logical operations according to the embodiments.

An access network connects a network interface of a gateway or network device to interconnected networks, such as the Internet. The network interface can be an Ethernet interface, a 3G network interface, a 4G network interface, a WiMAX network interface, or any other network interface of a network device. A network interface can also be a virtual network interface of a virtual machine (VM). An access network is in form of optical fiber, Ethernet, ATM, Frame Relay, T1/E1, IPv4, IPv6, wireless technologies, Wi-Fi, WiMAX, High-Speed Packet Access technology, 3GPP Long Term Evolution (LTE) or the like.

A gateway is a device or a node on a network which performs protocol conversion between different types of networks or applications. A gateway also performs network address and port address translation and is capable of allowing an end-to-end connection to be established. The term gateway is not meant to be limited to a single type of device, as any device such as, a hardware or software, that allows a user to communicate with network(s) may also be considered as a gateway for purposes of this application. The gateway couples with a plurality of multiple networks. A router, a switch, a bridge, a wireless access point, a virtual machine in a computing device or an access point may all be considered as a gateway for purposes of this invention. According to the present invention, the gateway comprises at least two network interfaces.

An end-to-end connection is a connection between a source node and a destination node. An end-to-end connection may include one or more WAN connections and one or more intermediate nodes. In one of the embodiments of the present invention, an end-to-end connection between a source node and a destination node is a virtual private network (VPN) tunnel.

A tunnel is an end-to-end connection established between two gateways using their respective tunnel interfaces and one or more WAN connections. A tunnel is established using a tunneling protocol that encapsulates one type of protocol data unit (PDU) into another type of protocol data unit. Examples of tunneling protocols include, but are not limited to, Generic Routing Encapsulation (GRE) and Layer-2 Tunneling Protocol (L2TP). A tunnel creates a virtual point-to-point connection between two network nodes. Tunnels may or may not encrypt the encapsulated Protocol Data Unit such as an IP packet. More than one tunnel interface can be established using the same network interface of a gateway. The two gateways on each end of a tunnel may be directly connected or may be connected through one or more interconnected networks.

An information packet is a Protocol Data Unit (PDU) that contains control information, such as address information, and user data. An information packet can be a network layer PDU such as Internet Protocol (IPv4 or IPv6), a transport layer PDU such as Transmission Control Protocol (TCP) or User Datagram Protocol (UDP), or PDU of any other protocol that is capable of carrying information over an access network.

FIG. 2A illustrates steps performed during the data transfer phase of a TCP connection according to one of the embodiments of the present invention. In this embodiment, STLP 105 sends ACK corresponding to the sequence number of the next byte consecutive to the last data byte sequence received (sequence numbered 7300) regardless of if all data bytes, before the last data byte sequence number, is received. The steps performed in this embodiment may be implemented using the network configuration illustrated in FIG. 3. FIG. 2A should be viewed in conjunction with FIG. 1A and FIG. 1B to better understand this embodiment. Steps 108 to 112 in FIG. 2A to are identical to steps 108 to 112 in FIG. 1A. Some details such as sequence numbers, ACK numbers, data byte numbers corresponding to the segments are not shown in FIG. 2A, but they are discussed herein.

Processes such as SULP 106, CULP 103, STLP 105 or CTLP 104 may be executed by one or more processing units, such as processing unit 600. Instructions of the processes are stored in computer readable storage medium, such as secondary storage 603 and main memory 601. Data transmission and reception between client node 101 and server node 102 is performed using one or more network interfaces, such as network interfaces 604-607.

At step 213, SULP 106 sends data transmission request to STLP 105. STLP 105 creates segment 226 with sequence number 17001 as it has already received an ACK numbered 17001 in the previous segment 125 from CTLP 104. Number range of data bytes in segment 226 is 17001 to 18000. The ACK flag is set and the ACK number in segment 226 is 7301 because number of the last data byte in segment 125 received by STLP 105 was 7300. In this illustration, as at this stage, the largest sequence number is also the last sequence number among the data bytes received. The acknowledgement number, therefore, corresponds to the sequence number of the next data byte expected (sequence number 7301) consecutive to the last sequence number (sequence number 7300) among the data bytes received in previous segment. At this particular step, STLP 105 sends the ACK corresponding to the data bytes carried in segment 125 even though the previous segments 123 and 124 were not received by STLP 105. This mechanism of sending ACK for the last received data bytes, even if previous data bytes have not been received, results in reducing the number of data transmissions steps performed by CTLP 104. This reduction of data transmission steps may make TCP throughput faster but at the same time making it prone to unreliability. If the lost data bytes carried by segments 123 and 124 are needed by SULP 106, then SULP 106 may detect and rectify the data loss situation by requesting for retransmission of the corresponding data bytes. One with regular skill in the art would appreciate that there is no limitation on how a ULP will handle retransmission requests. At the end of step 213 CTLP 104 receives segment 226 and delivers the data bytes carried in segment 226 to CULP 103. In one variant, if an acknowledgement corresponding to the sequence number of the next byte consecutive to the last data sequence number received is already sent, there is no need to send an acknowledgement corresponding to the sequence number of the next byte consecutive to the last byte received.

CTLP 104 does not respond to the missing ACKs for the bytes sent with segments 122 and 123. It is possible that segments are arrived out of sequence. Therefore, a segment with a larger ACK number may arrive earlier than another segment with a smaller ACK number. For example, for illustration purpose, segment 124 may arrive at client node 101 later than segment 226. CTLP 104 does not respond to any ACKs with smaller numbers when ACKs with larger numbers has already been received.

At step 214, CULP 103 does not have any more data to send. Therefore, CULP 103 does not send any data transmission request to CTLP 104. CTLP 104 sends segment 227 with ACK flag set and the ACK number 18001 to confirm the receipt of data bytes upto 18000. Although segment 227 does not contain any data bytes, segment 227 still has a sequence number 7301 because segment 227 contains an ACK. STLP 105 receives the segment 227 and is then notified that client node 101 has received data bytes upto 18000.

At step 215, SULP 106 sends data and data transmission request to STLP 105. STLP 105 sends segment 228 with sequence number 18001 containing 1000 data bytes with sequence number 18001-19000. The ACK flag is not set. Segment 228 does not contain any ACK because an ACK corresponding to the sequence number of the next data byte (sequence number 7301) consecutive to the last data byte sequence number (sequence number 7300) of the previous segment 125 has already been sent with segment 226, and another segment 227 without any data bytes has been received after receiving segment 226.

At step 216, SULP 106 sends data and data transmission request to STLP 105. STLP 105 sends segment 229 with sequence number 19001 containing 500 data bytes numbered 19001-19500. No ACK is sent with segment 229 either, due to the same reason no ACK was sent with segment 228. The ACK flag in this segment 229 is also not set or is not required to set.

At step 217, CULP 103 still does not have any more data to send. Therefore, CULP 103 does not send any data transmission request to CTLP 104. CTLP 104 sends segment 230 with ACK flag set and the ACK number 19501 to confirm the receipt of data bytes upto 19500. Although segment 230 does not contain any data bytes, it still has a sequence number 7301 because it contains an ACK. STLP 105 receives segment 230 and notifies that client node 101 has received data bytes upto 19500. In connection termination phase 120B the TCP connection between client node 101 and server node 102 is terminated.

In one variant, when a receiving TLP replies with an ACK for one or more particular TCP segments received, the TLP may also send ACKs for missing TCP segments. The missing TCP segments are TCP segments that are lost, dropped or have arrived late. In one example, when the TCP segment arrived late, the receiving node received the missing TCP segments later than the one or more particular TCP segments but the missing TCP segments have sequence numbers smaller than the sequence number of the one or more particular TCP segments. It is preferred that the ACKs are sent in the order of TCP segments. Therefore, if the missing TCP segments are TCP segments that were sent earlier than the one or more particular TCP segments, the receiving node should send the ACKs for the missing TCP segments earlier than the ACK for one or more particular TCP segments received.

This embodiment is also different from the Selective Acknowledgement (SACK) implementation in TCP. The transport layer processes in this embodiment does not substantially decide whether to retransmit unacknowledged bytes. Those who are skilled in the art would appreciate that, under SACK, a receiving transport layer process sends ACK to the sending transport layer process for the segments received out of order and keeps those out of order segments in buffer. The sending transport layer process retransmits only the bytes contained in those segments that were lost or corrupted during transmission.

Retransmission based on receiving three duplicate ACKs as described herein is shown only as an example. There is no limitation that retransmission has to be based on receiving three duplicate ACKs. Any other methods corresponding to TCP retransmission of data bytes, including retransmission based on Retransmission Timeout (RTO), can be used to implement the methods described in the present invention.

In one variant of this embodiment, a sending transport layer process is not concerned about the value of the ACK received from a receiving transport layer process. In this particular variant, the receiving transport layer process may use any arbitrarily selected ACK value and the sending transport layer process may not process the ACK values.

In one variant of this embodiment a sending transport layer process continues to transmit bytes ignoring the rwnd limit set by the receiving transport layer process.

In one variant of this embodiment, the receiving TLP uses SACK to provide acknowledgments to the sending TLP.

TCP is commonly used as a full-duplex protocol where two TLPs, or a pair of TCP endpoints, can send and receive data at the same time. Therefore, both CTLP 104 and STLP 105 are capable to perform according to the modified acknowledgement methods disclosed in the present invention simultaneously. But to keep the description of the embodiments simple, the modified acknowledgement methods disclosed in the present invention is illustrated only in the steps where CTLP 104 is the sending TLP and STLP 105 is the receiving TLP. One with ordinary skill in the art would readily recognize that CTLP 104 and STLP 105 are capable to function as both a sender and a receiver simultaneously.

To implement the TCP transmission methods disclosed in the present invention any value can be inserted in the fields of the TCP header as necessary. Also, to implement the TCP transmission methods disclosed in the present invention, value of one or more particular fields of the TCP header may be ignored by either the sending transport layer process or the receiving transport layer process as necessary.

TCP acknowledgement methods described in the present invention may be implemented as software or hardware in operating systems, networking devices or as individual software or hardware module separately or in any combination.

Embodiments of the present invention are capable of being implemented in a network node, such as single or multiple Wide Area Network (WAN) site-to-site VPN router. Such multi-WAN site-to-site VPN routers are illustrated in FIG. 3 as network node 301 and network node 302. In one variant, an aggregated logical connection may be established through multiple WAN connections between two network nodes. For example, network node 301 may establish a plurality of logical connections with network node 302 using a plurality of WAN connections, such as 312(1), 312(2), 312(3), 314(1) and 314(2). The logical connections include VPN connections, tunnels or end-to-end connection. The aggregated connection carries information packets by encapsulation. The logical connections may pass through one or more intermediate nodes, such as network devices 341*a*, 341*b* and 341*c*.

In one variant of this embodiment, all TCP sessions are sent and received through only one tunnel or only one aggregated tunnel. TCP sessions are then sent and received using a plurality of tunnels or a plurality of aggregated tunnels.

FIG. 4 is a flow diagram of one of the embodiments illustrating a method of acknowledging TCP segments. For readability, FIG. 4 is described in conjunction with FIG. 3. In this embodiment, a single TCP connection is used between two network nodes, for example, network nodes 301 and 302, to send and receive all segments. The TCP connection may be perceived as a tunnel between network nodes 301 and 302. There is no limitation to the number of TCP connections allowed to be established between network nodes 301 and 302. When one of network nodes 301 and 302 is the sender node, the other node is receiver node. In one example, client node 101 and server node 102 may be implemented by network node 301 and network node 302 respectively. There is no restriction that network node 301 must be a client node and there is also no restriction that network node 302 must be a server node. For example, network node 301 may be server node 102 and network node 302 may be client node 101. The TCP connection may be established through one of connections WAN connections 312 and one of WAN connections 314.

At step 401, the sender node selects a single tunnel to be used to send Protocol Data Units (PDUs) to the receiver node. The selected single tunnel may be the only tunnel or one of a plurality of tunnels established between the sender node and receiver node. The tunnel is established using TCP and through one of WAN connections 312 and one of WAN connections 314. If there is no tunnel established yet, sender node will establish a tunnel using TCP with the receiver node.

At step 402, the sender node receives or generates a datagram. A datagram may be, without limitation, one or more PDUs such as IP packets, transport layer segments, Ethernet frames, Internet Protocol security (IPSec) or Generic Routing Encapsulation (GRE) data units. A datagram at this step may also include one or more blocks of data bytes with a particular starting and ending point based on any known or future-developed standard or protocol. The datagram at this step may be received by the sender node from a device directly connected to the sender node, residing in a remote network or residing in a local area network (LAN) accessible by the sender node. The datagram may also be generated by the sender node itself.

At step 403, the sender node sends the PDU to the receiver node through the selected tunnel. At step 404, the receiver node receives the PDU from the sender node through the tunnel.

At step 405, the TLP corresponding to the tunnel of the receiver node sends acknowledgement to the TLP corresponding to the tunnel of the sender node for the data bytes contained in the received TCP segment regardless of whether previous data bytes have been received or not. As a result, transport layer process does not handle the retransmission. Upper layer processes at sender node and receiver node may be able to rectify any data loss by handling the retransmission at the respective upper layers.

There is no limitation that step 401 must be performed before step 402. For example, step 401 may performed after step 402 and before step 403. There is no limitation that the PDUs sent by sender node have to be belonging to the same session even though TCP segments encapsulating the PDUs belong to the same TCP session. For example, the PDUs may belong to different sessions, such as one session for web browsing and another session for file transfer. As TCP segment do not include a session identifier, the source address, source port number, destination address and destination port number of the TCP segment encapsulating the PDUs may be the same regardless if the PDUs belong to the same session.

In one variant, after step 403, sender node sends further PDUs to the receiver node regardless if sender node receives a corresponding TCP acknowledgment from the receiver node as the corresponding TCP acknowledgment may lost or may be delayed. The corresponding TCP acknowledgement is for acknowledging a TCP segment received, like the acknowledgment sent in step 111 in FIG. 1. Therefore, steps 404-405 may be performed after the further PDUs were sent. There is no limitation to the number of further PDUs may be sent before a corresponding TCP acknowledgment is received.

In one variant, step 403 is repeated until all PDUs are sent regardless if sender node receives the corresponding TCP acknowledgment from the receiver node. This allows higher utilization of the tunnel comparing to waiting for a corresponding TCP acknowledgement. Flow control and retransmission may be performed by transport layer using other means, such as sending flow control message in a PDU, instead of relying on acknowledgment. For example, after step 403, sender node will not send further PDUs until receiving a message from the receiver node. The message may indicate the last or the largest TCP segments received.

The message may also be any indicator to instruct the sender node to continue or to hold off sending further PDUs.

FIG. 7 illustrates how PDU is encapsulated in a TCP/IP packet. Payload of an IP packet may contain a TCP segment. A TCP segment contains a TCP header and a TCP payload. The TCP payload may contain any upper layer data, user data, any type of tunnel header and/or PDU as illustrated by packet 700. Information related to a tunnel is encapsulated in the tunnel header. The information may be used for tunnel maintenance, tunnel identification, checksum, and sequencing. In one variant, a tunnel sequence number and a global sequence number are included in the tunnel header. Tunnel sequence number may represent a sequence number that is assigned to each packet using the particular TCP session.

The tunnel sequence number may be used to monitor packet drop of a tunnel and estimate packet drop rate of the tunnel. The global sequence number may be used to for reordering packets transmitted through plurality of tunnels of an aggregated tunnel. The global sequence number may also be used to identify missing packets. A particular session corresponding to different PDUs may use the same source address, source port number, destination address and destination port number. Those who are skilled in the art would appreciate that the source port number, destination port number, sequence number, acknowledgment number and among other things are stored in the TCP header.

FIG. 5 is a flow diagram of one of the embodiments illustrating a method of acknowledging TCP segments. For readability, FIG. 5 is described in conjunction with FIG. 3. In this embodiment, a plurality of TCP connections are used between two network nodes, for example, network nodes 301 and 302, to send and receive all segments. The plurality of TCP connections are aggregated together to form one aggregated tunnel. Each TCP connection operates as an individual tunnel and is established through one of WAN connections 312 and one of WAN connections 314.

At step 501, the sender node determines a plurality of access networks, each of which may comprise one or more TCP based tunnels, to establish the aggregated tunnel. There is no limitation on the number of TCP based tunnels in the aggregated tunnel. For example, for illustration purpose only, three TCP based tunnels are in the aggregated tunnel. The three tunnels are established through access networks 312(1) and 314(1), access networks 312(1) and 314(2) and access networks 312(3) and 314(2) through a plurality of WAN interfaces of network node 301 and a plurality of WAN interfaces of network node 302. In another example, also for illustration purpose only, four TCP based tunnels are in the aggregated tunnel and access network 314(2) is not functional. The four tunnels are established through access networks 312(1) and 314(1), access networks 312(2) and 314(1), access networks 312(3) and 314(1) and access networks 312(1) and 314(1). In this example, two tunnels are established through access networks 312(1) and 314(1).

At step 502, the sender node receives a PDU or a plurality PDUs from a device directly connected to the sender node or residing in a remote network or residing in a local area network (LAN) accessible by the sender node. The PDU is destined for the receiver node or a network node reachable through the receiver node.

At step 503, the sender node selects one of the tunnel of the plurality of tunnels in the aggregated tunnel to send the PDU. When there are a plurality of PDUs to be sent through the aggregated tunnel, the PDUs may be sent through the same tunnel or different tunnels of the aggregated tunnel. For example, the first PDU may be sent through a tunnel established with access networks 312(1) and 314(2); the second PDU may be sent through a tunnel established with access networks 312(3) and 314(1). In one variant, the same PDU may be duplicated and sent through different tunnels.

At step 504, the sender node sends the PDU to the receiver node through the selected tunnel. At step 505, the receiver node receives the PDU through the selected tunnel from the sender node. However, it is possible that the PDU may not be received by the receiver node due to a myriad of reasons, including packet drop, network congestion and network reliability. When there are a plurality of PDUs being sent, one or more of the plurality of PDUs may be lost. When PDUs arrived at the receiver node, the order of arrival may not be in the same order as the order the PDUs left the sender node.

At step 506, the transport layer process corresponding to the tunnel of the receiver node sends acknowledgement to the transport layer process corresponding to the tunnel of the sender node to the received TCP segment regardless of whether TCP segments with previous sequence numbers have been received or not. In this particular embodiment, the transport layer process does not handle the retransmission or reordering. Upper layer processes at sender node and receiver node may be able to rectify any data loss and out-of-order arrival by handling the retransmission or buffering at the respective upper layers.

In one variant, PDUs belonging to the same session are sent through the same tunnel from the sender node to the receiver node. Sender node may identify a session based on various session identification techniques, including deep packet inspection (DPI) and a combination of source address, destination address, source port number, destination port number, or any other values in the protocol headers.

In one variant, there is no limitation that PDUs belonging to the same session are sent through the same tunnel from the sender node to the receiver node. Multiple tunnels of the aggregated tunnel, which is based on a plurality of tunnels, may be used to transmit and receive PDUs between two network nodes. When PDUs are received at the receiver node, the PDUs will first be stored into a computer readable non-transitory storage medium. The processing unit at the receiver node re-order the PDUs and identify missing PDUs.

In one variant, after step 504, sender node sends further PDUs to the receiver node regardless if sender node receives a corresponding TCP acknowledgment from the receiver node as the corresponding TCP acknowledgment may lost or may be delayed. The corresponding TCP acknowledgement is for acknowledging a TCP segment received, like the acknowledgment sent in step 111 in FIG. 1A and FIG. 2A. Therefore, steps 505-506 may be performed after the further PDUs were sent.

There is no limitation to the number of further PDUs may be sent before a corresponding TCP acknowledgment is received as long as the total data-bytes sent is less than the receive-window or a retransmission-timeout has occurred. There is also no limitation that the further PDUs have to use the same tunnel. For example, the first PDU is sent through a first tunnel, the second PDU is sent through a second tunnel, additional PDUs may be sent through the first, the second or other tunnels.

In another example, the first PDU is encapsulated in a first TCP/IP packet and sent through network interface 605 to a first WAN connection, such as WAN connection 312(1); the second PDU is encapsulated in a second TCP/IP packet and sent through network interface 606 to a second WAN connection, such as WAN connection 312(2); and other PDUs are encapsulated in corresponding TCP/IP packets and sent through any of network interfaces and corresponding WAN connections, such as WAN connections 312. As the TCP/IP packets may be sent through any of WAN connections 312, the source IP address of the TCP/IP packets will have the IP address of the WAN connection being used. Therefore, the first TCP/IP packets may have different source IP address from the second TCP/IP packets. Depending on the termination end of the tunnels, destination IP address of the TCP/IP packets may be the same or different. Network interfaces 605 and 606 are WAN interfaces.

In one variant, step 504 is repeated until all PDUs are sent regardless if sender node receives the corresponding TCP acknowledgment from the receiver node. This allows higher utilization of the tunnel comparing to waiting for a corresponding TCP acknowledgement. Flow control and retransmission may be performed by transport layer using other means, such as sending flow control message in a PDU, instead of relying on acknowledgment. For example, after step 404, sender node will not send further PDUs until receiving a message from the receiver node. The message may indicate the last or the largest TCP segments received. The message may also be any indicator to instruct the sender node to continue or to hold off sending further PDUs.

FIG. 2B illustrates steps of an example performed during the data transfer phase of two TCP connections according to the present invention. A plurality of CULPs 283 send data to SULPs 286 through corresponding CTLPs 284 and STLPs 285. There is no limitation on the number of CULPs 283, CTLPs 284, STLPs 285 and SULPs 286 that can concurrently take part in data transmission and reception between client node 101 and server node 102. For example, there may be ten of CULPs 283, CTLPs 284, STLPs 285 and SULPs 286. Each TCP connection, for example, CULP 283*a*-CTLP 284*a*-STLP 285*a*-SULP 286*a*, is used to transmit and receive data for one TCP session, while CULP 283*b*-CTLP 284*b*-STLP 285*b*-SULP 286*b* is used to transmit and receive data for another TCP session. The number of TCP sessions is not limited in the present invention.

STLP 285*a* sends ACK corresponding to the last byte of a last segment received from CTLP 284*a* regardless of if one or more previous segments were not received. Similarly, STLP 285*b* sends ACK corresponding to the last byte of a last segment received from CTLP 284*b* regardless of if one or more previous segments were not received.

The steps performed in this embodiment may be implemented using the network configuration illustrated in FIG. 3. Processes such as CULPs 283, CTLPs 284, STLPs 285 and SULPs 286, may be executed by one or more processing units, such as processing unit 600. Instructions of the processes are stored in computer readable storage medium, such as secondary storage 603 and main memory 601. Data transmission and reception between client node 101 and server node 102 is performed using one or more network interfaces, such as network interfaces 604-607.

At step 240, CULP 283*a* sends a data transmission request to CTLP 284*a*. CTLP 284*a* then uses Initial Sequence Number (ISN), for illustration purpose, value of 2001 as determined in connection establishment phase 107 to send the first 100 bytes of data of a first session with segment 251*a*. Similarly at step 241, CULP 283*b* sends a data transmission request to CTLP 284*b*. CTLP 284*b* then uses ISN, for illustration purpose, value of 12001 to send the first 100 bytes of data of a second session with segment 251*b*. As CULP 283*a*-CTLP 284*a*-STLP 285*a*-SULP 286*a* and CULP 283*b*-CTLP 284*b*-STLP 285*b*-SULP 286*b* are two different sessions, ISN values in segments 251*a* and 251*b* are not correlated.

There is no limitation whether the data sent in segments 251*a* and 251*b* belong to the same or different sessions. The first session and the second session with segments 251*a* and 251*b* may be the same session or different session. For example, the data may belong to the same session from the same host, like a web browsing session from a laptop. In another example, the data may belong to a plurality of file transfers among different computing devices connected to client node 101 and server node 102 respectively.

At step 242, for illustration purpose only, CTLPs 284*a* continues to send the rest of data not sent in segment 251*a*. Those who are skilled in the art would appreciate that the size of data sent by CULP 283*a* at step 240 may be larger than what segment 251*a* could hold. Therefore, a plurality of segments are used. As CULP 283*a* already passed the data to CTLP 284*a* at step 240, CULP 283*a* is not required to send data at step 242. CTLP 284*a* uses sequence number 2101 segments 252*a*. For illustration purpose, segment 252*a* is successfully received by server node 102.

At step 243, CULP 283*b* again sends a data transmission requests to CTLP 284*b*. CTLPs 284*b* then uses sequence number 12101 for segment 252*b*. For illustration purpose, segment 252*b* is not received by server node 102.

Then at steps 244 and 245, CTLPs 284*a* and 284*b* again send data transmission requests to CTLPs 284*a* and 284*b* respectively. CTLPs 284*a* and 284*b* then uses sequence number 2201 and 12201 for segments 253*a* and 253*b* respectively. For illustration purpose, segment 253*a* is not successfully received by server node 102 but segment 253*b* is successfully received by server node 102

At steps 247 and 248, STLPs 285*a* and 285*b* creates segments 254*a* and 254*b* in response to segments 252*a* and 253*b* respectively as the last segments received are segments 252*a* and 253*b*. There is no acknowledgement to segment 253*a* because it was not received.

Segment 254*b* holds an acknowledgement of segment 253*b* even though segment 252*b* was not received. This is different from TCP acknowledgement in prior-art which SULP 248 should respond by sending an acknowledgement of segment 251*b*. In the present invention, the acknowledgement of segment 253*b* will make CTLP 284*b* believe that segments 251*b*-253*b* are received by STLP 105.

Segments 254*a* and 254*b* may hold data from SULPs 286*a* and 286*b* respectively. The data are sent along with the acknowledgements. If there is no data from SULP, a STLP may send the acknowledge without involvement of a SULP.

FIG. 8 is a flow diagram that illustrates an embodiment of the present invention. FIG. 8 should be viewed in conjunction with FIGS. 2A-2B and FIG. 3. In this embodiment a sending node, such as client node 101, determines whether to send the data bytes over UDP or over TCP to a receiving node, such as server node 102. In certain situations where data transmission using one of the two protocols may have better performance. Methods disclosed in this particular embodiment may be used in combination with the methods disclosing improved TCP transmission as illustrated in FIGS. 2A-2B, or any prior art TCP/UDP data transmission. It should be noted that the steps performed in this embodiment are performed before step 107.

At step 801, the sending application layer process, such as CULP 103, has one or more bytes to send to the receiving application layer process, such as SULP 106. The one or more bytes in this step may be data bytes of the received PDUs from the LAN devices comprised in site 307, or they may be test bytes generated by CULP 103. At step 802, CULP 103 sends the one or more bytes to the transport layer process, such as CTLP 104, and starts to wait for a time-period to determine whether the bytes were sent successfully to SULP 106. The time-period may be predetermined, configured by an administrator and/or received from a remote server. At step 803, CTLP 104 sends the one or more bytes to the receiving transport layer process, such as STLP 105, through network 310 using UDP.

At step 804, CULP 103 determines whether the one or more bytes were sent successfully to SULP 106. At this particular step, CULP 103 regards the data transmission to be successful if response corresponding to the transmitted bytes is received from SULP 106 within the predetermined time-period. The determination of whether the one or more bytes were sent successfully is based on whether CULP 103 receives a response from SULP 106 for the corresponding bytes with the predetermined time-period.

In conjunction with receiving response within the predetermined time-period, success of the transmission of bytes may also be determined based on other conditions such as, but not limited to, throughput rate, latency, rate of packet-loss. If at step 804, data transmission was determined to be successful, then at step 805 CULP 103 selects UDP to be used to send data. If at step 804, data transmission was determined not to be successful, then at step 806 CULP 103 selects TCP to be used to send data.

There is no limitation that transmission of the one or more bytes at step 803 must be performed using UDP as TCP can also be used to determine the better protocol. In this embodiment, if the protocol that is used first to test data transmission is satisfactory then that particular protocol us selected and the other protocol is not tested. But if the protocol that is used first to test data transmission is not satisfactory, then the other protocol is selected without performing any more testing. This may speed up the process of selecting a protocol, but using this method the more suitable protocol may not be tested and selected.

FIG. 9 is a flow diagram that illustrates an embodiment of the present invention. FIG. 9 should be viewed in conjunction with FIGS. 2A-2B and FIG. 3. Similar to the embodiment illustrated in FIG. 8, in this embodiment a sending node, such as client node 101, determines whether to send the data bytes over UDP or over TCP to a receiving node, such as server node 102. But in this particular embodiment both protocols are tested and the more suitable protocol for data transmission is selected by the sending application layer process, such as CULP 103.

At step 901, CULP 103 has one or more bytes to send to the receiving application layer process, such as SULP 106. The one or more bytes in this step may be data bytes of the received PDUs from the LAN devices comprised in site 307, or they may be test bytes generated by CULP 103.

At step 902, CULP 103 sends the one or more bytes to CTLP 104 to be transmitted to SULP 106 using both UDP and TCP. Furthermore, at this step, CULP 103 starts to wait for a time-period to determine whether the bytes were delivered to SULP 106. The time-period may be predetermined, configured by an administrator and/or received from a remote server. The predetermined time-period at this step may be same or different for each protocol. At step 903, CTLP 104 transmits the one or more bytes to STLP 105 using both UDP and TCP. At this particular step, CTLP 104 creates at least one socket connection with STLP 105 for each protocol (UDP and TCP) to transmit the one or more bytes to SULP 106. There is no limitation on how CTLP 104 transmits the bytes received from CULP 103 to STLP 105. CTLP 104 may transmit the one or more bytes to STLP 105 using UDP and TCP concurrently or sequentially.

At step 904, CULP 103 determines the performance of data transmission based on whether bytes were sent successfully to SULP 106 using both UDP and TCP. The determination of whether the bytes were sent successfully is based on whether CULP 103 receives response from SULP 106 for the corresponding bytes with the predetermined time-period, and in conjunction with other conditions. The other conditions disclosed here may include, but not limited to, throughput rate, latency, rate of packet-loss. Any relevant factor that can impact data transmission between the two nodes may be used individually or in any combination to determine whether bytes are successfully transmitted to SULP 106.

Based on the determination made on step 904, at step 905 CULP selects either TCP or UDP to send data to SULP 106. There is no restriction on CULP 103 to select the protocol that has higher data throughput rate, as any other condition used to measure the success of data transmission at step 904 may be used. In one variant of this embodiment, instead of CULP 103 selecting the protocol to use for data transmission, the selection is performed manually. For example, in this particular variant, the transmission performance related information determined at step 904 is made available to an user or administrator of client node 101 or server node 102 via any suitable method such as, but not limited to, Graphical User Interface (GUI), Command Line Interface (CLI), SMS.

There is no limitation that CTLP 104 must have assistance from CULP 103 to determining whether TCP should be used to transmit data. For example, in one embodiment, CTLP 104 determines whether TCP should be used to transmit data without any assistance from CULP 103 and provides the findings to CULP 103 or a user or administrator of client node 101.

FIG. 10 is a flow diagram that illustrates such an embodiment of the present invention. FIG. 10 should be viewed in conjunction with FIGS. 2A-2B and FIG. 3. At step 1001, CTLP 104 sends one or more bytes to STLP 105 using TCP. The one or more bytes sent at this step are generated by CTLP 104.

At step 1002, CTLP 104 determines whether the one or more bytes were delivered successfully to SULP 106. Successful delivery of bytes is determined by CTLP 104 in a similar manner as described in step 904 of FIG. 9. If at step 1002, CTLP 104 determines that the bytes were delivered successfully to STLP 105, then at step 1003 CTLP 104 determines TCP to be the preferred protocol to send data. If at step 1002, CTLP 104 determines that the bytes were not delivered successfully to STLP 105, then at step 1004 CTLP 104 determines UDP to be the preferred protocol to send data.

There is no limitation to the TCP versions for the embodiments illustrated in FIG. 8-10. For example, the TCP protocol may include one or more of ACK, CACK, SACK implementations, or other TCP versions such as Taho TCP, Reno TCP, or TCP methods disclosed in the embodiments of the present invention.

Furthermore, there is no restriction that only TCP or UDP has to be selected as a method for data transmissions. Any other protocol such as, but not limited to, SCTP or RSVP, may be determined to be used as a preferred protocol for data transmission.

Figure 1A:
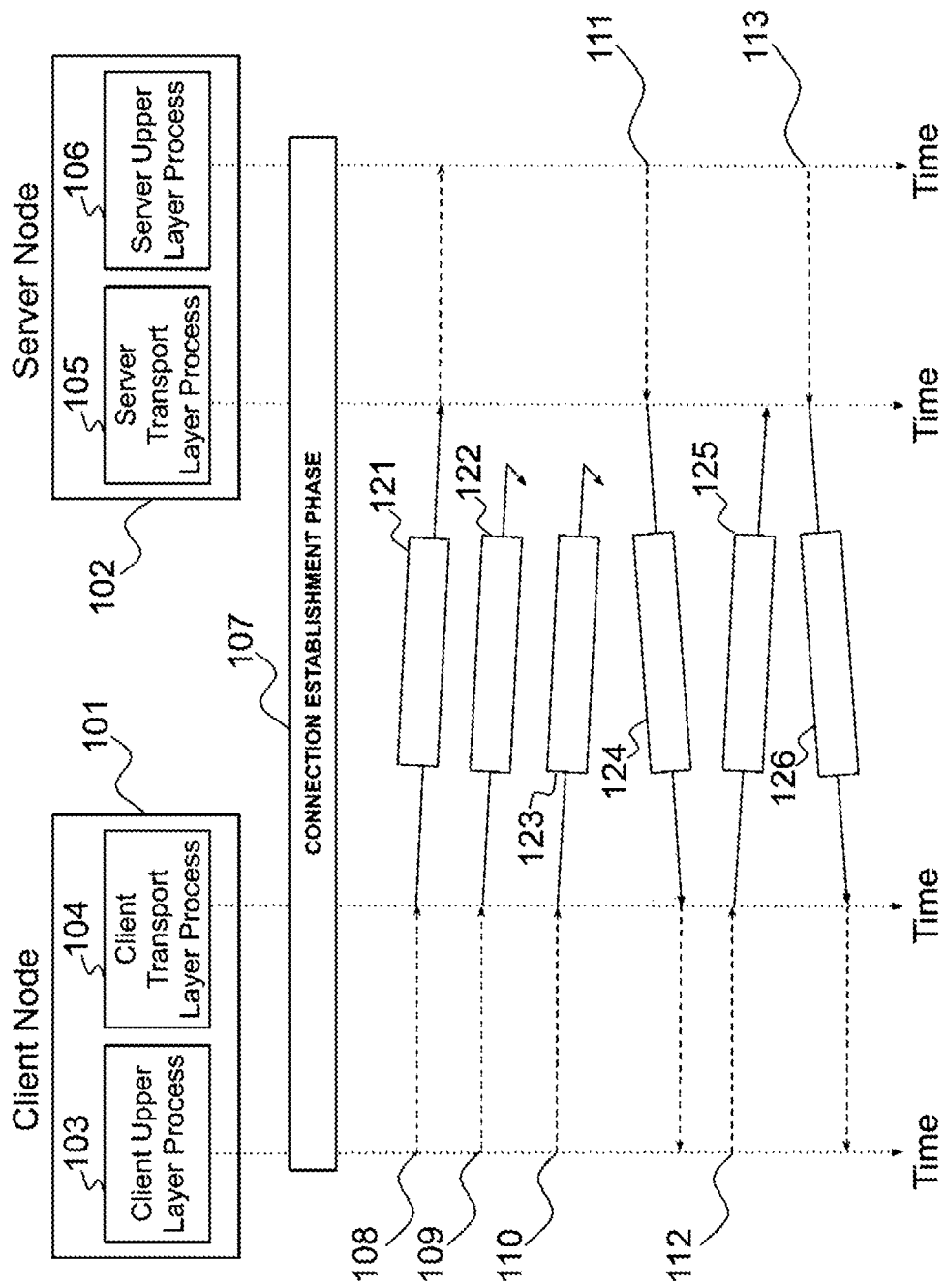
FIG. 1A illustrates the first part of a sequence diagram based on a prior art TCP implementation.
Figure 1B:
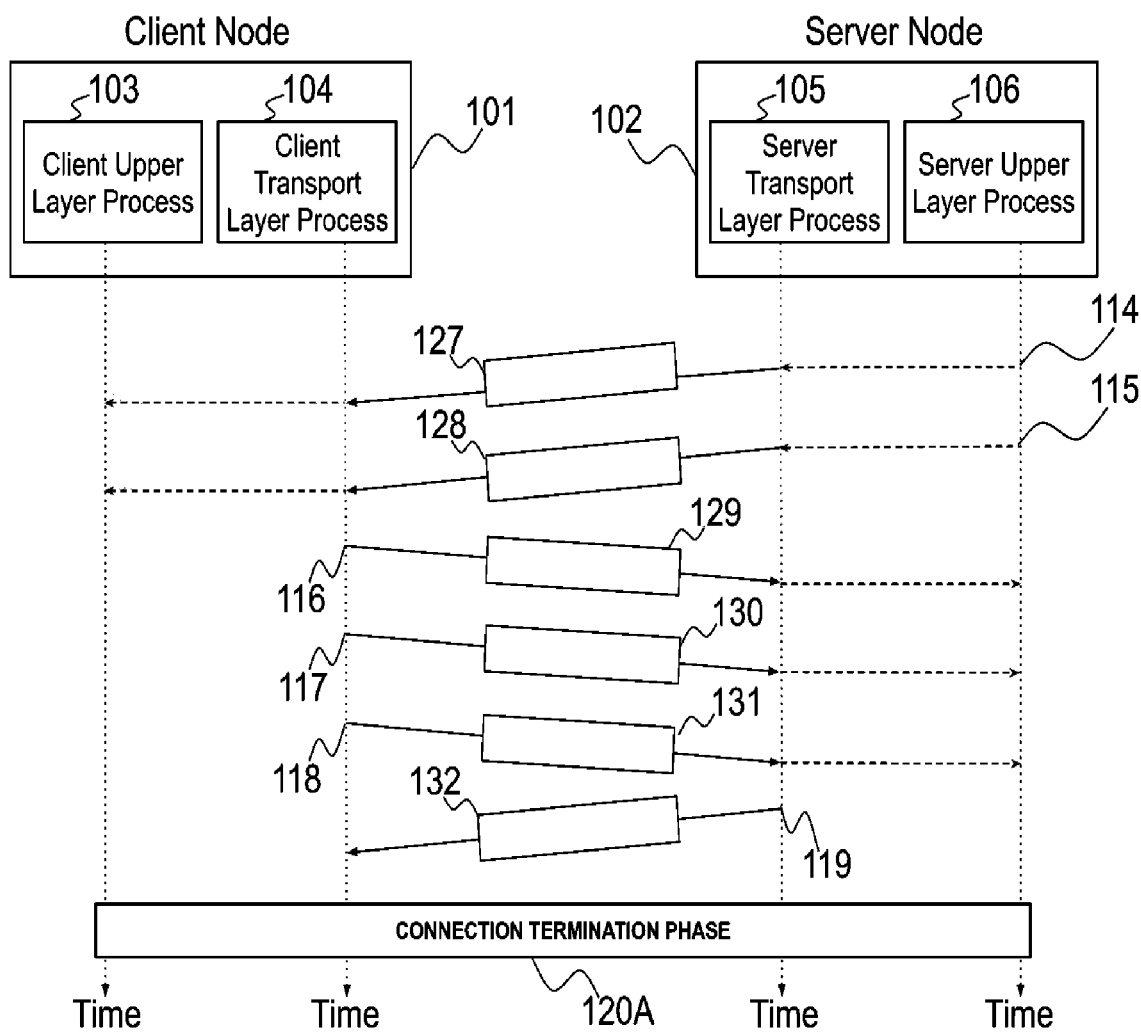
FIG. 1B illustrates the last part of the sequence diagram shown in FIG. 1A.
Figure 2A:
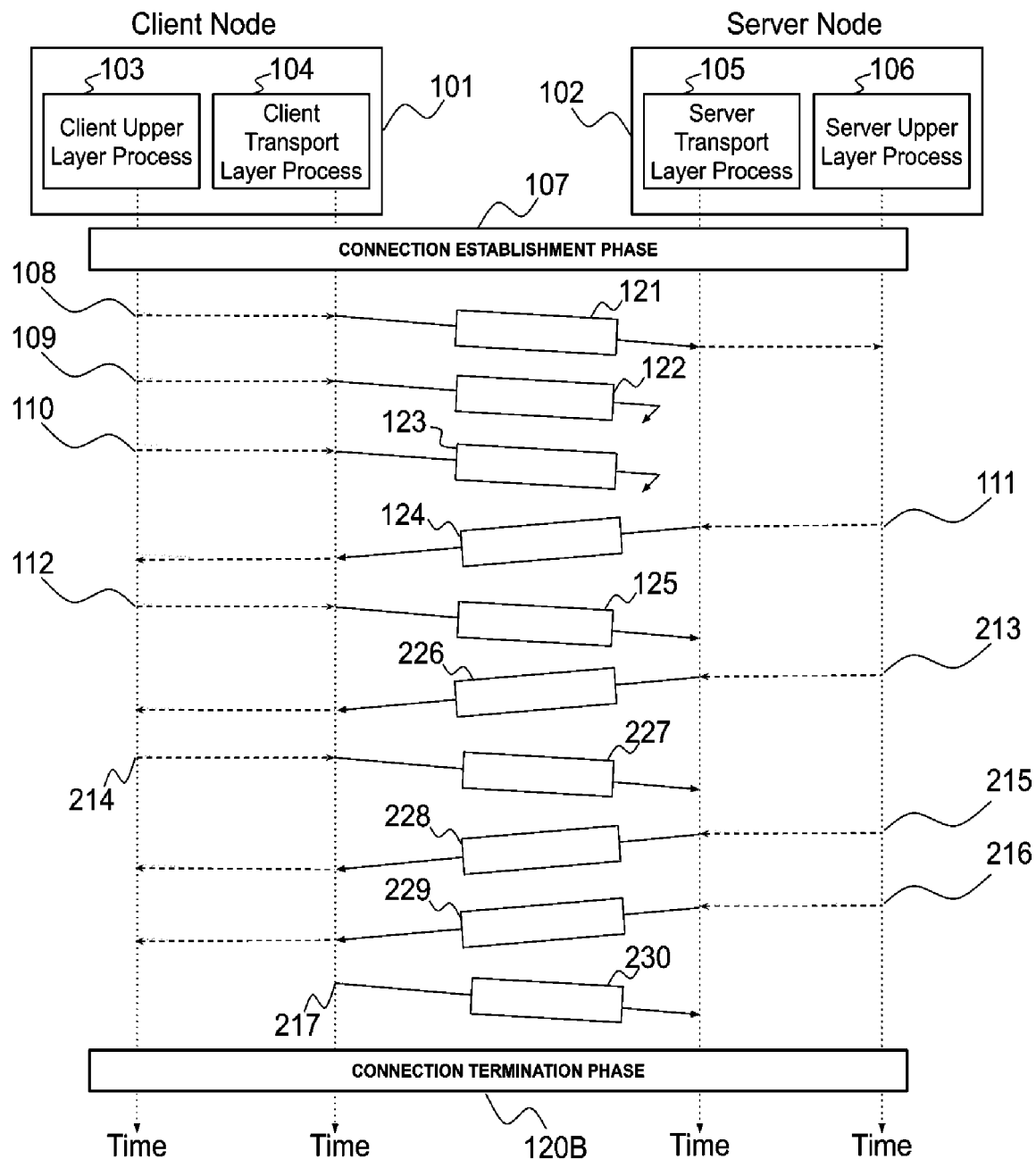
FIG. 2A illustrates a sequence diagram of a TCP implementation using one TCP session based on one embodiment of the present invention.
Figure 2B:
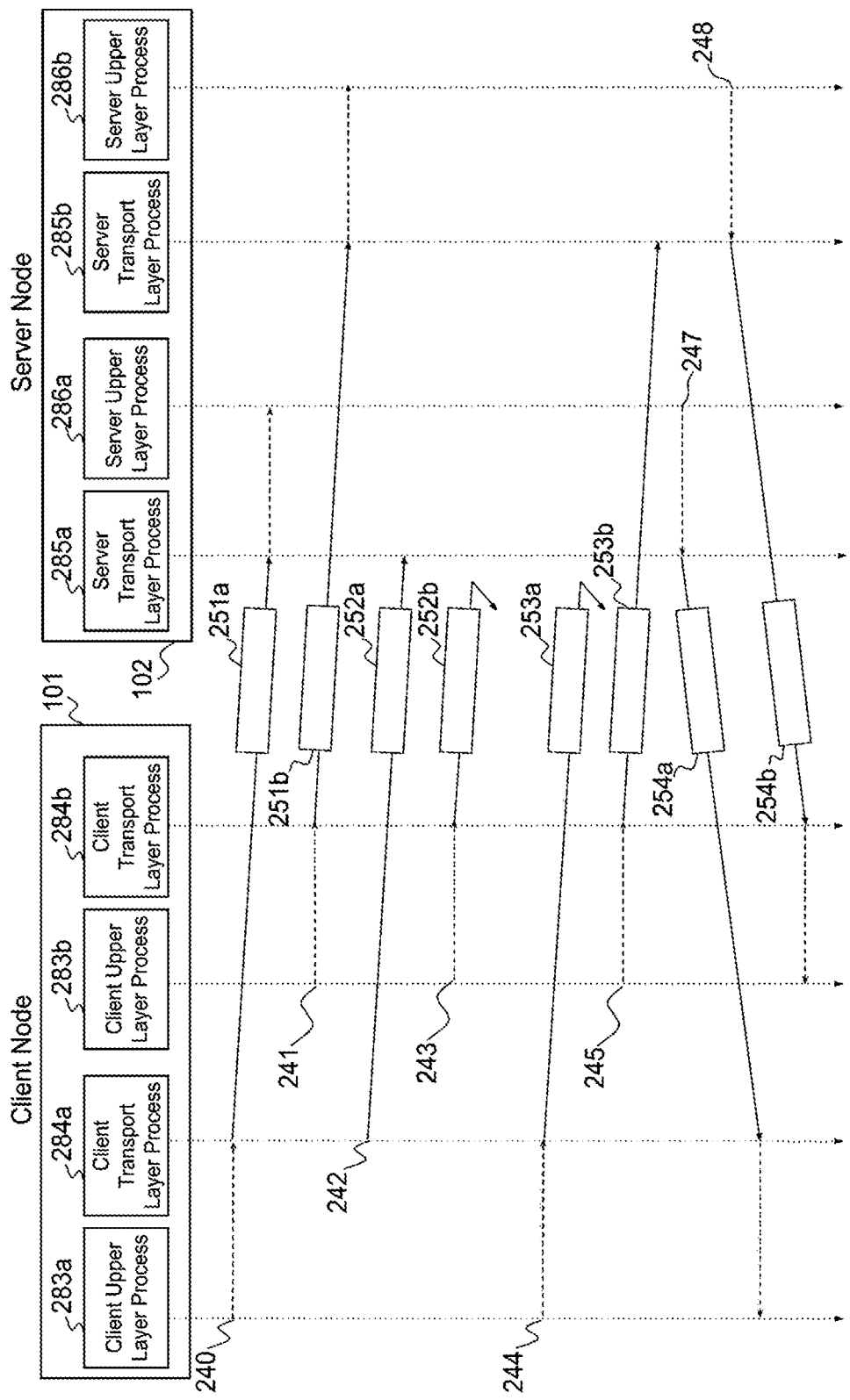
FIG. 2B illustrates a sequence diagram of a TCP implementation using two TCP sessions based on one embodiment of the present invention.
Figure 3:
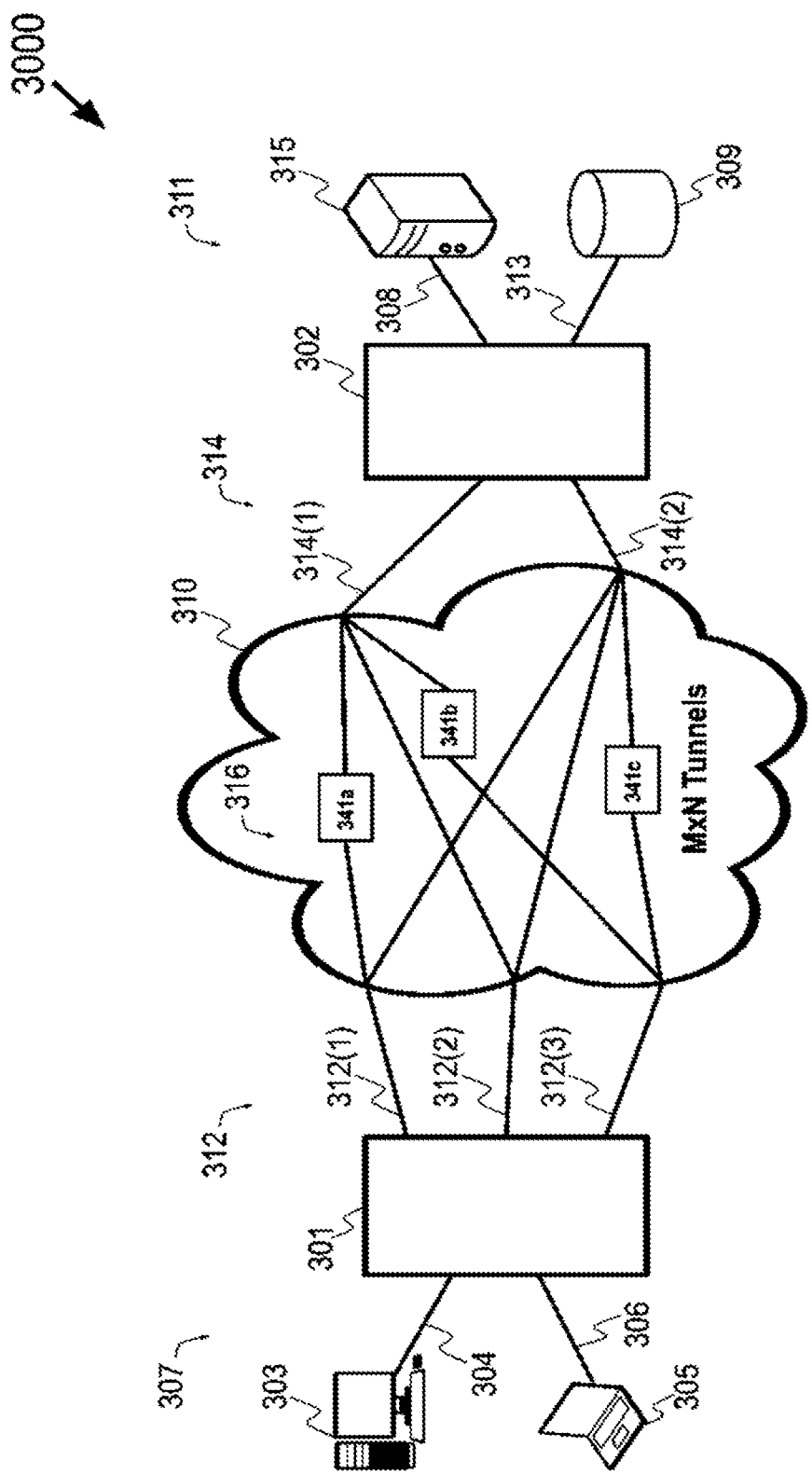
FIG. 3 illustrates a network diagram where a plurality of network nodes can communicate with each other based on the TCP implementation according to one embodiment of the present invention.
Figure 4:
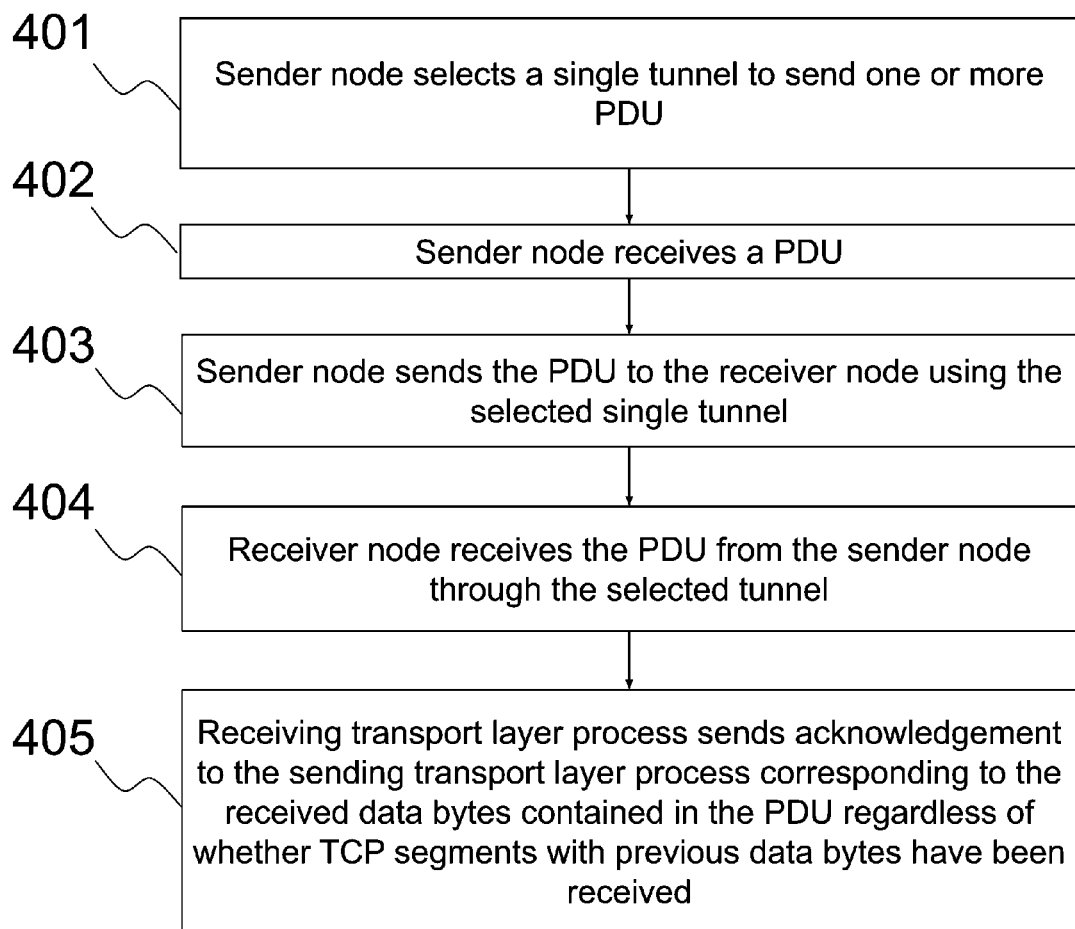
FIG. 4 illustrates steps performed by a network router to transmit data according to one embodiment of the present invention.
Figure 5:
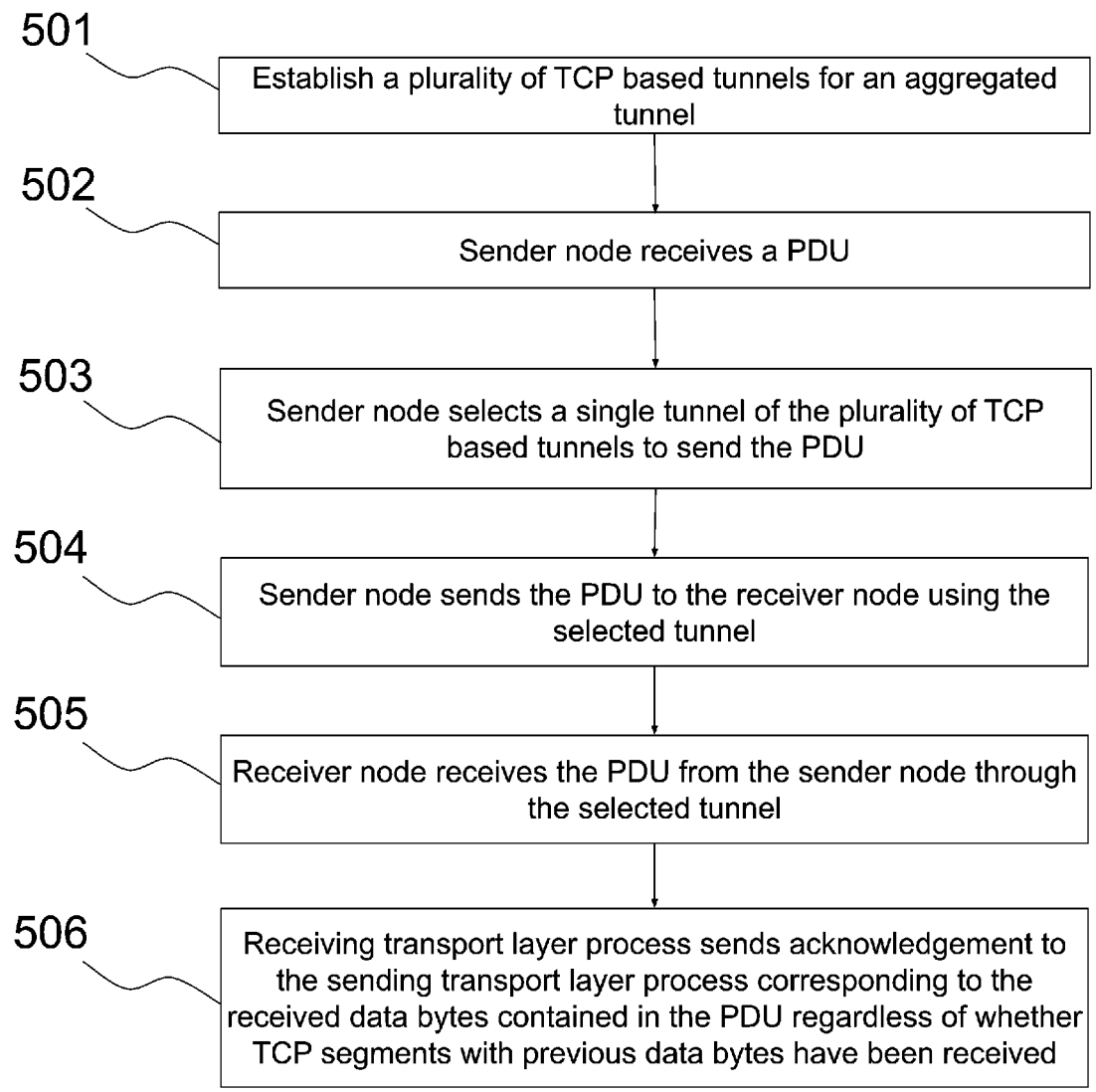
FIG. 5 illustrates steps performed by a network router to transmit data according to one embodiment of the present invention.
Figure 6:
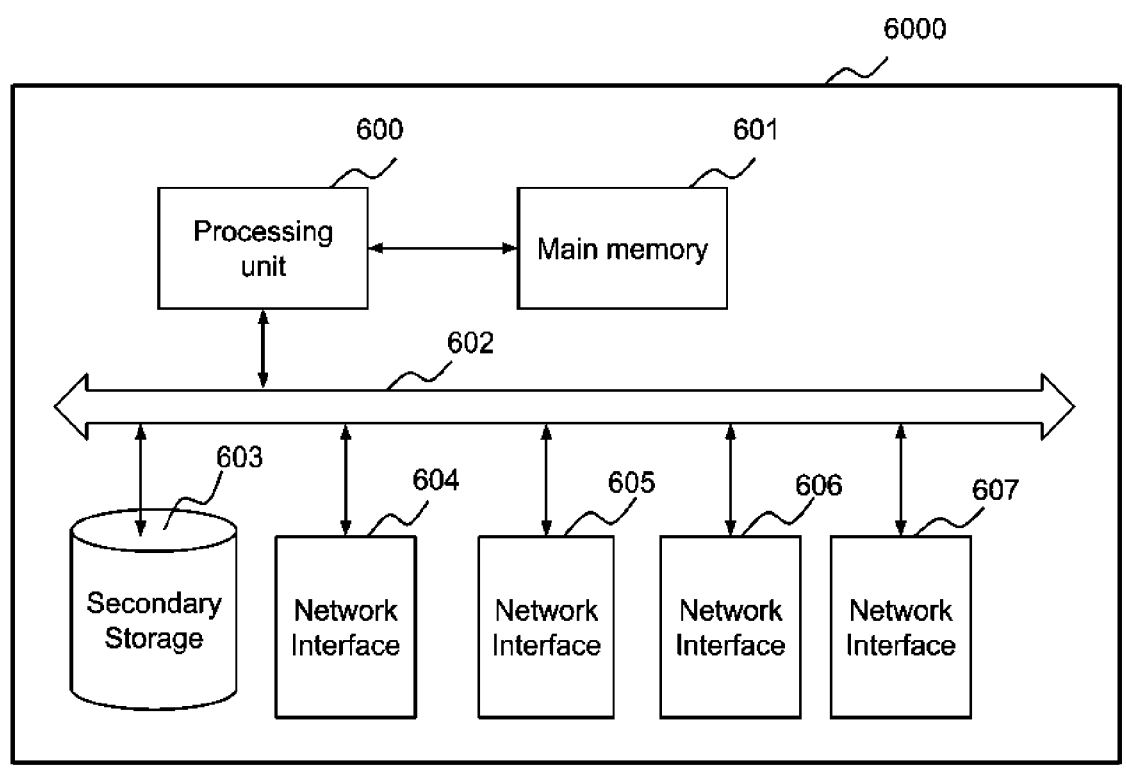
FIG. 6 illustrates a block diagram of a network router that is capable of transmitting data according to one embodiment of the present invention.
Figure 7:
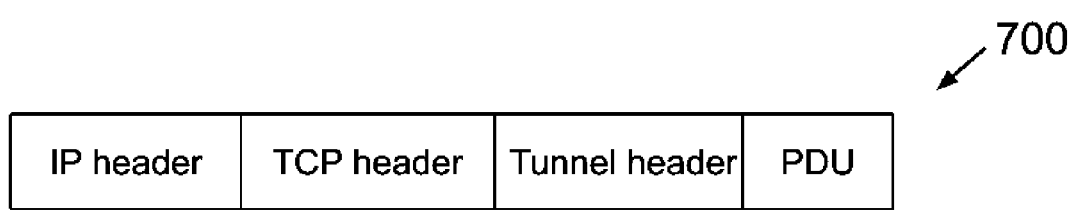
FIG. 7 illustrates a block diagram of encapsulation method of a PDU.
Figure 8:
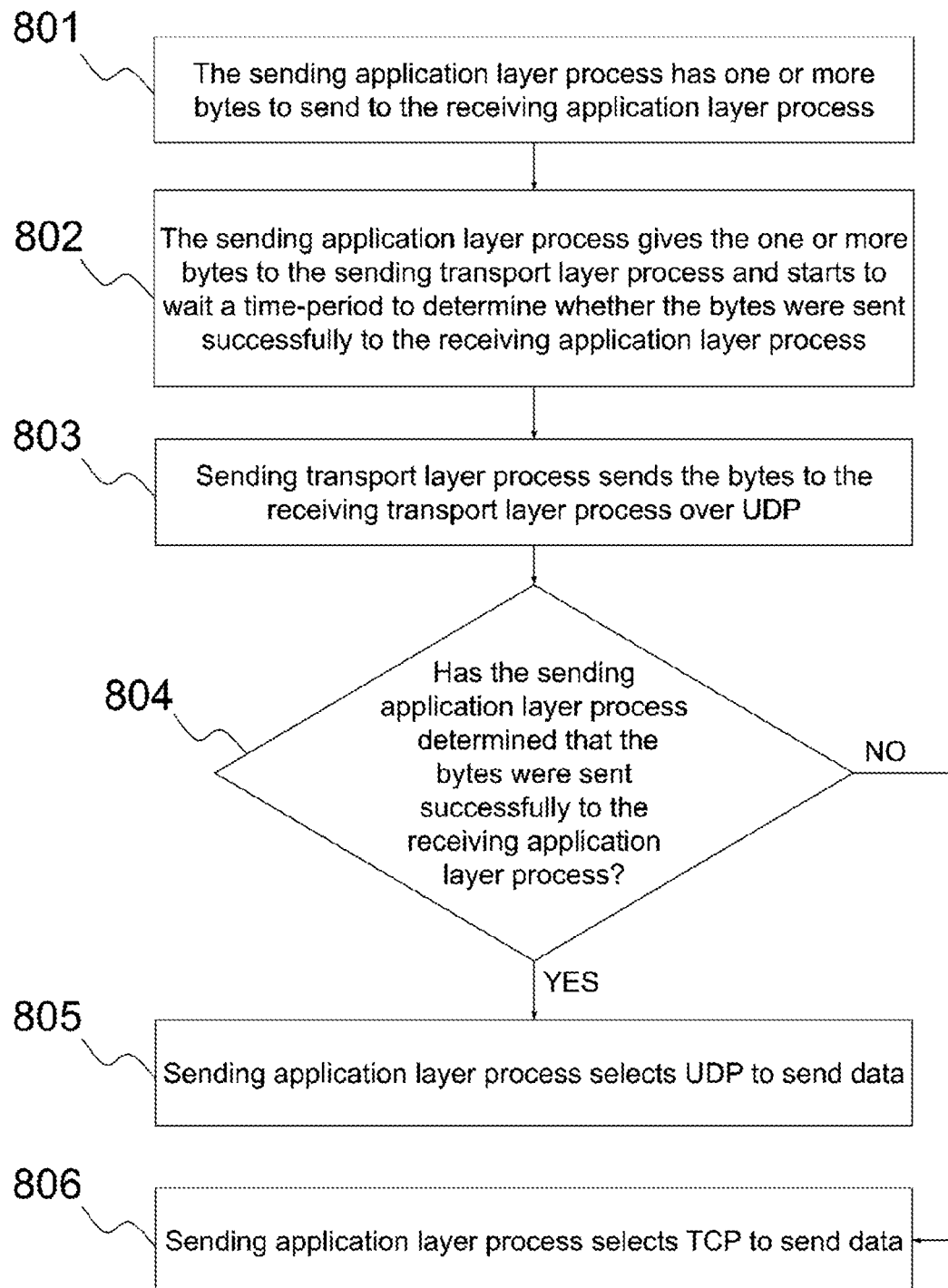
FIG. 8 illustrates steps performed by a network router to select a protocol to use to transmit data according to one embodiment of the present invention.
Figure 9:
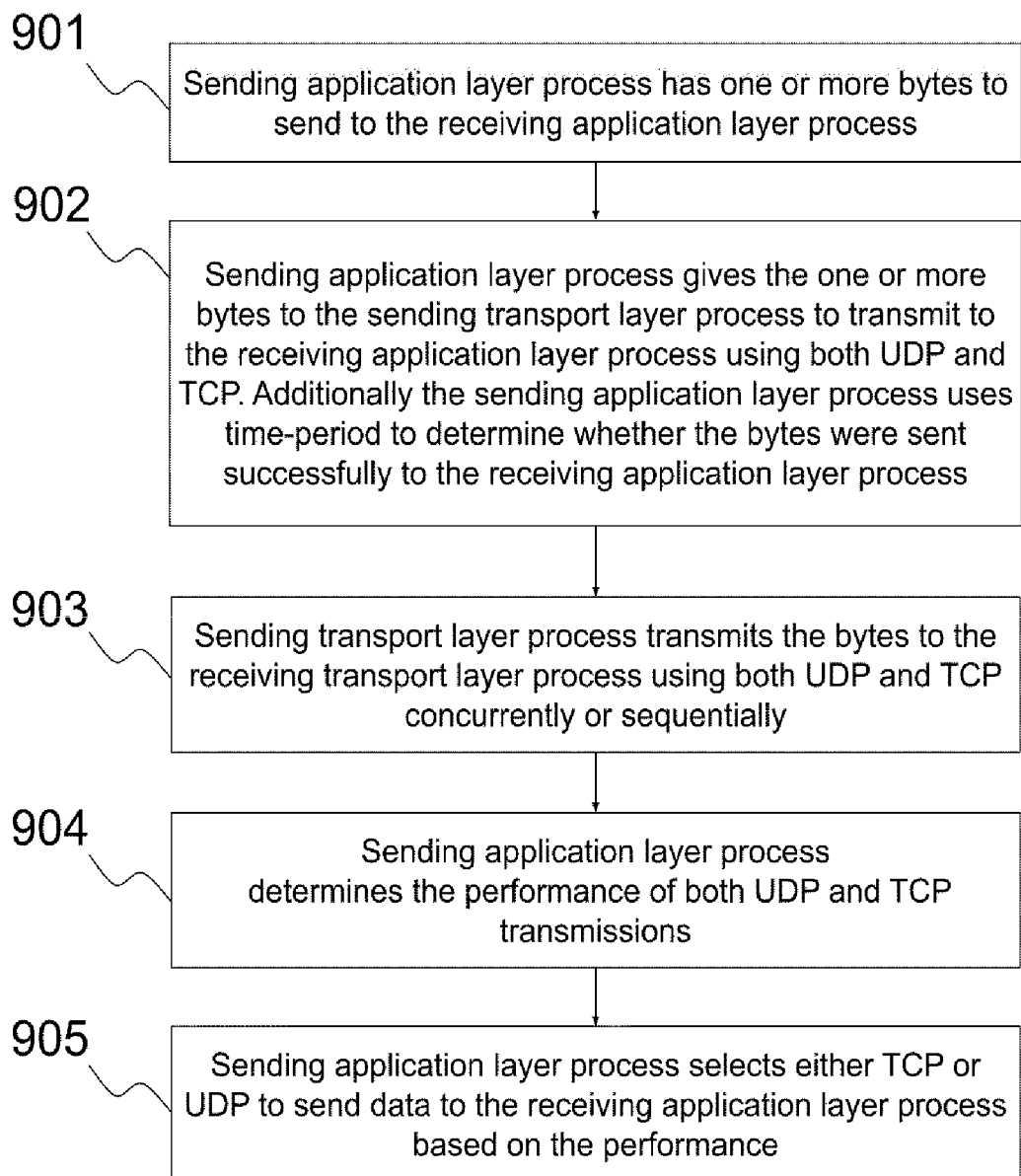
FIG. 9 illustrates steps performed by a network router to select a protocol to use to transmit data according to one embodiment of the present invention.
Figure 10:
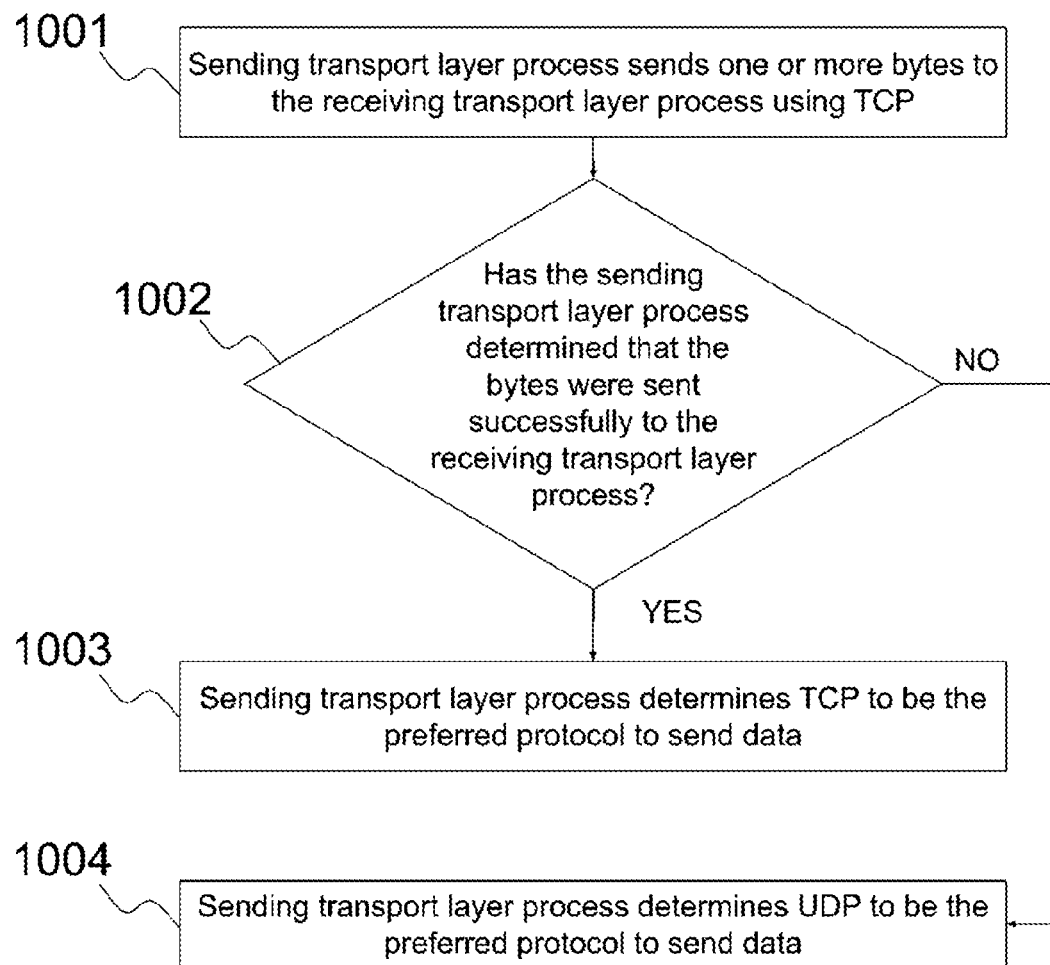
FIG. 10 illustrates steps performed by a network router to select a protocol to use to transmit data according to one embodiment of the present invention.

The invention claimed is:

1. A method of sending datagrams from a first network node to a second network node, comprising:
    (a) at the first network node, establishing a first aggregated tunnel with the second network node; wherein the first aggregated tunnel comprises a first plurality of tunnels;
    (b) at the first network node, receiving datagrams of a first session from a host;
    (c) at the first network node, selecting at least one tunnel in the first plurality of tunnels;
    (d) at the first network node, encapsulating a first plurality of datagrams into a first plurality of Transmission Control Protocol/Internet Protocol (TCP/IP) packets;
    (e) at the first network node, sending the first plurality of TCP/IP packets to the second network node via the at least one tunnel;
    (f) at the second network node, receiving at least one TCP/IP packet in the first plurality of TCP/IP packets from the first network node via the at least one tunnel;
    (g) at the second network node, sending an acknowledgment in a plurality of acknowledgments to the first network node; wherein the acknowledgment corresponds to the at least one TCP/IP packet received at step (f);
    (h) at the first network node, when receiving the acknowledgment from the second network node, encapsulating a second plurality of datagrams into a second plurality of TCP/IP packets; and
    (i) at the first network node, sending the second plurality of TCP/IP packets to the second network node without waiting to receive any further acknowledgment in the plurality of acknowledgments from the second network node;

wherein:
    the first plurality of datagrams and the second plurality of datagrams are the datagrams of the first session received from the host at step (b);
    the acknowledgment is sent at step (g) using a transport layer process corresponding to at least one tunnel of the second network node to a transport layer process corresponding to the at least one tunnel of the first network node;
    the transport layer process at the first network node and the transport layer process at the second network node do not handle retransmission;
    the acknowledgement received at step (h) includes an acknowledgement number;
    the acknowledgement number is a largest sequence number among sequence numbers of all TCP/IP packets in the first plurality of TCP/IP packets received by the second network node;
    each acknowledgment in the plurality of acknowledgments corresponds respectively to each TCP/IP packet in the first plurality of TCP/IP packets; and
    the second plurality of TCP/IP packets are sequential to the first plurality of TCP/IP packets.

2. The method of claim 1, wherein the acknowledgement number is consecutive to a sequence number of a last TCP/IP packet in the first plurality of TCP/IP packets received by the second network node.

3. The method of claim 1, wherein:
    the first aggregated tunnel is established at step (a) through a first plurality of wide area network (WAN) connections between the first network node and the second network node; and
    the first plurality of tunnels comprise comprises at least one first tunnel established using a satellite connection and at least one second tunnel established using a 5G connection.

4. The method of claim 1, further comprising:
    after the datagrams of the first session are received at step (b):
    (i) determining whether the datagrams of the first session are to be sent over TCP or User Datagram Protocol (UDP); and
    (ii) selecting the TCP to send the datagrams of the first session;
    wherein the acknowledgement number corresponds to a sequence number of a next-expected TCP/IP packet in the second plurality of TCP/IP packets received by the second network node.

5. The method of claim 1, further comprising retransmitting part of the first plurality of datagrams to the second network node;
    wherein:
    the part of the first plurality of datagrams is originally encapsulated in one or more TCP/IP packets of the first plurality of TCP/IP packets and the one or more TCP/IP are not received by the second network node; and
    the host is connected to the first network node through a local area network (LAN) connection.

6. The method of claim 1, further comprising:
    (j) receiving datagrams of a second session from the host;
    (k) encapsulating a plurality of datagrams of the second session into a plurality of UDP/IP packets; and
    (l) sending the plurality of UDP/IP packets to the second network node via a second aggregated tunnel;
    wherein the second aggregated tunnel is established between the first network node and the second network node.

7. The method of claim 6, wherein:
the second aggregated tunnel is established through a second plurality of WAN connections between the first network node and the second network node; and
the second aggregated tunnel comprises a second plurality of tunnels.

8. The method of claim 7, wherein the second plurality of tunnels comprises at least one first tunnel established using a satellite connection and at least one second tunnel established using a 5G connection.

9. The method of claim 6, further comprising:
after the datagrams of the second session are received at step (j):
(i) determining whether the datagrams of the second session are to be sent over TCP or UDP; and
(ii) selecting the UDP to send the datagrams of the second session.

10. A method of sending datagrams from a first network node to a second network node, comprising:
(a) at the first network node, establishing a first aggregated tunnel with the second network node; wherein the first aggregated tunnel comprises a first plurality of tunnels;
(b) at the first network node, establishing a second aggregated tunnel with the second network node; wherein the second aggregated tunnel comprises a second plurality of tunnels;
(c) at the first network node, receiving datagrams of a session from a host;
(d) at the first network node, selecting at least one first tunnel in the first plurality of tunnels;
(e) at the first network node, encapsulating a first plurality of datagrams into a first plurality of Transmission Control Protocol/Internet Protocol (TCP/IP) packets;
(f) at the first network node, sending the first plurality of TCP/IP packets to the second network node via the at least one first tunnel;
(g) at the second network node, receiving at least one TCP/IP packet in the first plurality of TCP/IP packets from the first network node via the at least one first tunnel;
(h) at the second network node, sending an acknowledgment in a plurality of acknowledgments to the first network node; wherein the acknowledgment corresponds to the at least one TCP/IP packet received at step (g);
(i) at the first network node, when receiving the acknowledgment from the second network node, encapsulating a second plurality of datagrams into a second plurality of TCP/IP packets;
(j) at the first network node, sending the second plurality of TCP/IP packets to the second network node without waiting to receive any further acknowledgment in the plurality of acknowledgments from the second network node;
(k) at the first network node, encapsulating a third plurality of datagrams into a plurality of User Datagram Protocol/Internet Protocol (UDP/IP) packets; and
(l) at the first network node: sending the plurality of UDP/IP packets to the second network node through at least one second tunnel in the second plurality of tunnels;
wherein:
the first plurality of datagrams, the second plurality of datagrams, and the third plurality of datagrams are the datagrams of the session received from the host at step (c);

the acknowledgment is sent at step (h) using a transport layer process corresponding to at least one tunnel of the second network node to a transport layer process corresponding to the at least one tunnel of the first network node;
the transport layer process at the first network node and the transport layer process at the second network node do not handle retransmission;
the acknowledgement received at step (i) includes an acknowledgement number;
the acknowledgement number is one of: (i) a largest sequence number among sequence numbers of all TCP/IP packets in the first plurality of TCP/IP packets received by the second network node, (ii) consecutive to a sequence number of a last TCP/IP packet in the first plurality of TCP/IP packets received by the second network node, and (iii) corresponds corresponding to a sequence number of a next-expected TCP/IP packet in the second plurality of TCP/IP packets received by the second network node;
each acknowledgment in the plurality of acknowledgments corresponds respectively to each TCP/IP packet in the first plurality of TCP/IP packets; and
the second plurality of TCP/IP packets are sequential to the first plurality of TCP/IP packets.

11. The method of claim 10, further comprising:
(m) determining network performance of the sending of the first plurality of TCP/IP packets and network performance of the sending of the plurality of UDP/IP packets; and
(n) selecting, based on the network performance of the sending of the first plurality of TCP/IP packets and the network performance of the sending of the first plurality of UDP/IP packets, the first aggregated tunnel or the second aggregated tunnel to be used to send further datagrams of the session;
wherein:
each of the first aggregated tunnel and the second aggregated tunnel is established through a plurality of wide area network (WAN) connections between the first network node the second network node;
the host is connected to the first network node through a local area network (LAN) connection.

12. A system, comprising:
a first network node; and
a second network node;
wherein the first network node comprises:
at least one first network interface;
at least one first processing unit;
at least one first main memory; and
at least one first secondary storage storing program instructions executable by the at least one first processing unit and configured to cause the at least one first processing unit to perform:
(a) establishing a first aggregated tunnel with the second network node; wherein the first aggregated tunnel comprises a first plurality of tunnels;
(b) receiving datagrams of a first session from a host;
(c) selecting at least one tunnel in the first plurality of tunnels;
(d) encapsulating a first plurality of datagrams into a first plurality of Transmission Control Protocol/Internet Protocol (TCP/IP) packets;
(e) sending the first plurality of TCP/IP packets to the second network node via the at least one tunnel;
(f) when receiving an acknowledgment in a plurality of acknowledgments from the second network node, encapsulating a second plurality of datagrams into a second plurality of TCP/IP packets; wherein the acknowledgment corresponds to at least one TCP/IP packet in the first plurality of TCP/IP packets received by the second network node; and (g) sending the second plurality of TCP/IP packets to the second network node without waiting to receive any further acknowledgment in the plurality of acknowledgments from the second network node;

wherein the second network node comprises:
at least one second network interface;
at least one second processing unit;
at least one second main memory; and
at least one second secondary storage storing program instructions executable by the at least one second processing unit and configured to cause the at least one second processing unit to perform:

(h) receiving the at least one TCP/IP packet from the first network node via the at least one tunnel; and
(i) sending the acknowledgment to the first network node; and wherein:
the first plurality of datagrams and the second plurality of datagrams are the datagrams of the first session received from the host at step (b);
the acknowledgment is sent at step (i) using a transport layer process corresponding to at least one tunnel of the second network node to a transport layer process corresponding to the at least one tunnel of the first network node;
the transport layer process at the first network node and the transport layer process at the second network node do not handle retransmission;
the acknowledgement received at step (f) includes an acknowledgement number;
the acknowledgement number is a largest sequence number among sequence numbers of all TCP/IP packets in the first plurality of TCP/IP packets received by the second network node;
each acknowledgment in the plurality of acknowledgments corresponds respectively to each TCP/IP packet in the first plurality of TCP/IP packets; and
the second plurality of TCP/IP packets are sequential to the first plurality of TCP/IP packets.

13. The system of claim 12, wherein the acknowledgement number is consecutive to a sequence number of a last TCP/IP packet in the first plurality of TCP/IP packets received by the second network node.

14. The system of claim 12, wherein:
the first aggregated tunnel is established at step (a) through a first plurality of wide area network (WAN) connections between the first network node and the second network node; and
the first plurality of tunnels comprises at least one first tunnel established using a satellite connection and at least one second tunnel established using a 5G connection.

15. The system of claim 12, wherein the at least one first secondary storage further stores program instructions executable by the at least one first processing unit and configured to cause the at least one first processing unit to perform:
after the datagrams of the first session are received at step (b):
(i) determining whether the datagrams of the first session are to be sent over TCP or User Datagram Protocol (UDP); and
(ii) selecting the TCP to send the datagrams of the first session;
wherein the acknowledgement number corresponds to a sequence number of a next-expected TCP/IP packet in the second plurality of TCP/IP packets received by the second network node.

16. The system of claim 12, wherein the at least one first secondary storage further stores program instructions executable by the at least one first processing unit and configured to cause the at least one first processing unit to perform retransmitting part of the first plurality of datagrams to the second network node;
wherein:
the part of the first plurality of datagrams is originally encapsulated in one or more TCP/IP packets of the first plurality of TCP/IP packets and the one or more TCP/IP are not received by the second network node; and
the host is connected to the first network node through a local area network (LAN) connection.

17. The system of claim 12, wherein the at least one first secondary storage further stores program instructions executable by the at least one first processing unit and configured to cause the at least one first processing unit to perform:
(j) receiving datagrams of a second session from the host;
(k) encapsulating a plurality of datagrams of the second session into a plurality of UDP/IP packets; and
(l) sending the plurality of UDP/IP packets to the second network node via a second aggregated tunnel;
wherein the second aggregated tunnel is established between the first network node and the second network node.

18. The system of claim 17, wherein:
the second aggregated tunnel is established through a second plurality of WAN connections between the first network node and the second network node; and
the second aggregated tunnel comprises a second plurality of tunnels.

19. The system of claim 18, wherein the second plurality of tunnels comprises at least one first tunnel established using a satellite connection and at least one second tunnel established using a 5G connection.

20. The system of claim 17, wherein the at least one secondary storage further stores program instructions executable by the at least one processing unit and configured to cause the at least one processing unit to perform:
after the datagrams of the second session are received at step (f):
(i) determining whether the datagrams of the second session are to be sent over TCP or UDP; and
(ii) selecting the UDP to send the datagrams of the second session.

* * * * *